(12) United States Patent
Kikin-Gil et al.

(10) Patent No.: US 11,836,180 B2
(45) Date of Patent: Dec. 5, 2023

(54) SYSTEM AND MANAGEMENT OF SEMANTIC INDICATORS DURING DOCUMENT PRESENTATIONS

(71) Applicant: Microsoft Technology Licensing, LLC, Redmond, WA (US)

(72) Inventors: Erez Kikin-Gil, Bellevue, WA (US); Benjamin David Smith, Woodinville, WA (US); Colleen Griffiths Estrada, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/843,393

(22) Filed: Jun. 17, 2022

(65) Prior Publication Data
US 2022/0318292 A1 Oct. 6, 2022

Related U.S. Application Data

(63) Continuation of application No. 16/193,082, filed on Nov. 16, 2018, now Pat. No. 11,423,073.

(51) Int. Cl.
*G06F 16/904* (2019.01)
*G10L 13/02* (2013.01)
*H04L 65/401* (2022.01)
*G06F 16/438* (2019.01)
*G06F 40/169* (2020.01)

(52) U.S. Cl.
CPC ........ *G06F 16/4393* (2019.01); *G06F 16/904* (2019.01); *G06F 40/169* (2020.01); *G10L 13/02* (2013.01); *H04L 65/4015* (2013.01)

(58) Field of Classification Search
CPC .. G06F 40/169; G06F 16/4393; G06F 16/904; G10L 13/02; H04L 65/4015
See application file for complete search history.

(56) References Cited

U.S. PATENT DOCUMENTS

| | | | | |
|---|---|---|---|---|
| 7,512,886 | B1 * | 3/2009 | Herberger | G11B 27/034 715/723 |
| 7,610,546 | B1 * | 10/2009 | Nagao | G06F 40/169 715/203 |
| 8,745,501 | B2 * | 6/2014 | Krantz | G11B 27/34 715/730 |
| 9,880,807 | B1 * | 1/2018 | Haggerty | G06F 3/167 |
| 10,089,059 | B1 * | 10/2018 | Taneja | G06F 16/686 |
| 10,564,924 | B1 * | 2/2020 | Jaeger | G06F 3/167 |
| 10,740,553 | B2 * | 8/2020 | Mullins | G06F 3/04855 |
| 11,024,194 | B1 * | 6/2021 | Beigman Klebanov | G09B 17/04 |

(Continued)

*Primary Examiner* — Scott T Baderman
*Assistant Examiner* — Mario M Velez-Lopez
(74) *Attorney, Agent, or Firm* — Novo TechIP International PLLC

(57) ABSTRACT

A data processing system implements displaying, on a first device to a first participant, a first user interface for presentation of audio content, the first user interface including a navigation tool configured to visually represent contextual events in the audio content and a first selectable indicator linked to a second participant. The data processing system further implements receiving a first user selection of the first selectable indicator; and initiating, in response to at least the first user selection, a first telecommunication session between the first participant and the second participant.

16 Claims, 19 Drawing Sheets

(56) References Cited

U.S. PATENT DOCUMENTS

| | | | | |
|---|---|---|---|---|
| 2002/0099552 | A1* | 7/2002 | Rubin | G09F 27/00 704/270 |
| 2005/0069225 | A1* | 3/2005 | Schneider | H04N 21/8583 382/305 |
| 2005/0071736 | A1* | 3/2005 | Schneider | G06F 16/48 715/201 |
| 2006/0161838 | A1* | 7/2006 | Nydam | G06F 40/169 715/201 |
| 2007/0030528 | A1* | 2/2007 | Quaeler | G06F 16/33 358/448 |
| 2007/0266304 | A1* | 11/2007 | Fletcher | G06F 40/169 715/230 |
| 2008/0235585 | A1* | 9/2008 | Hart | G06F 16/44 715/717 |
| 2009/0080635 | A1* | 3/2009 | Altberg | H04L 65/1069 379/216.01 |
| 2010/0110081 | A1* | 5/2010 | Arora | G06T 13/00 345/473 |
| 2011/0231474 | A1* | 9/2011 | Locker | G06F 16/60 715/203 |
| 2013/0104072 | A1* | 4/2013 | Havard | G09G 5/377 715/764 |
| 2013/0144603 | A1* | 6/2013 | Lord | H04L 67/306 704/235 |
| 2013/0144619 | A1* | 6/2013 | Lord | H04L 12/1822 704/235 |
| 2014/0115478 | A1* | 4/2014 | Moiseenko | G11B 27/34 715/723 |
| 2014/0250355 | A1* | 9/2014 | Jimison | G06F 3/0483 715/202 |
| 2015/0350601 | A1* | 12/2015 | Sinha | H04L 63/08 348/14.01 |
| 2015/0381440 | A1* | 12/2015 | Zhao | H04L 65/1066 709/204 |
| 2016/0036962 | A1* | 2/2016 | Rand | H04M 1/656 455/418 |
| 2016/0379395 | A1* | 12/2016 | Sirpal | G06F 3/167 715/727 |
| 2017/0185375 | A1* | 6/2017 | Martel | G06F 40/30 |
| 2019/0204998 | A1* | 7/2019 | Hartrell | G10L 15/26 |
| 2020/0174630 | A1* | 6/2020 | Rosenberg | G06F 3/013 |
| 2020/0285440 | A1* | 9/2020 | Prindle | G06F 16/9566 |
| 2021/0297461 | A1* | 9/2021 | Athwal | G06Q 20/22 |
| 2022/0036759 | A1* | 2/2022 | Proudfoot | G09B 5/06 |
| 2022/0400141 | A1* | 12/2022 | Curry | H04L 67/06 |
| 2023/0154218 | A1* | 5/2023 | Hong | G06V 30/36 382/229 |

* cited by examiner

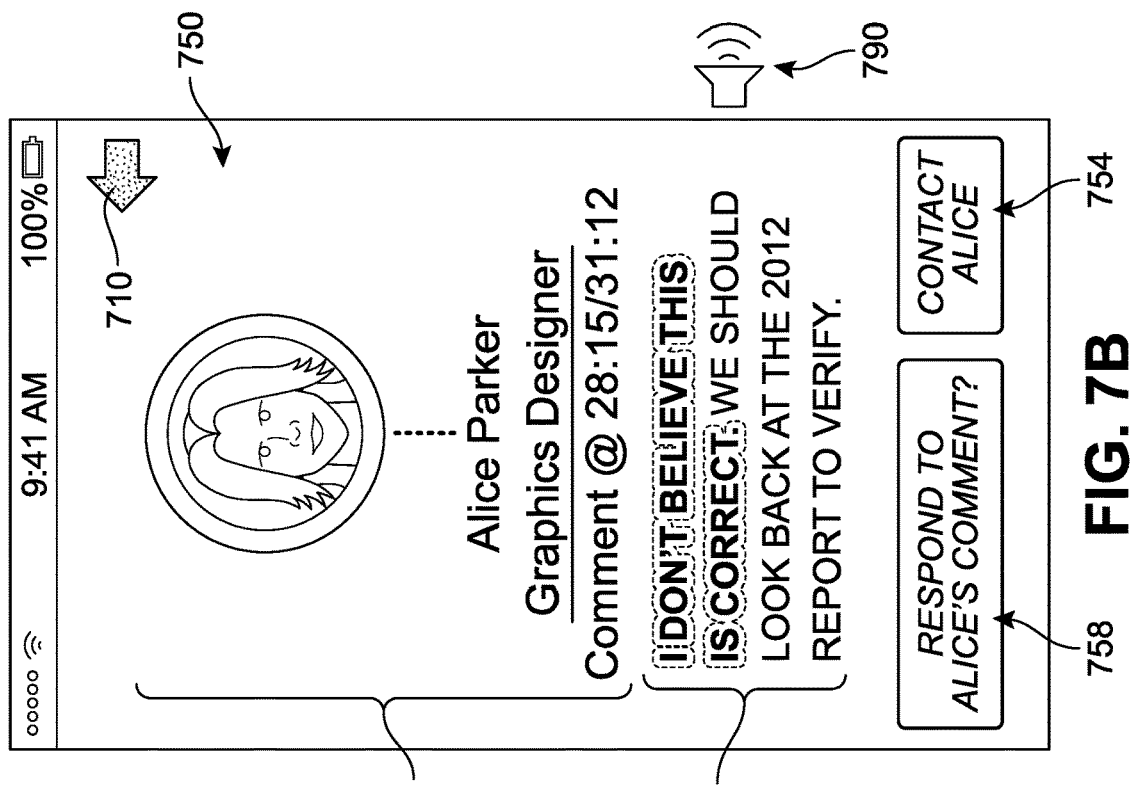
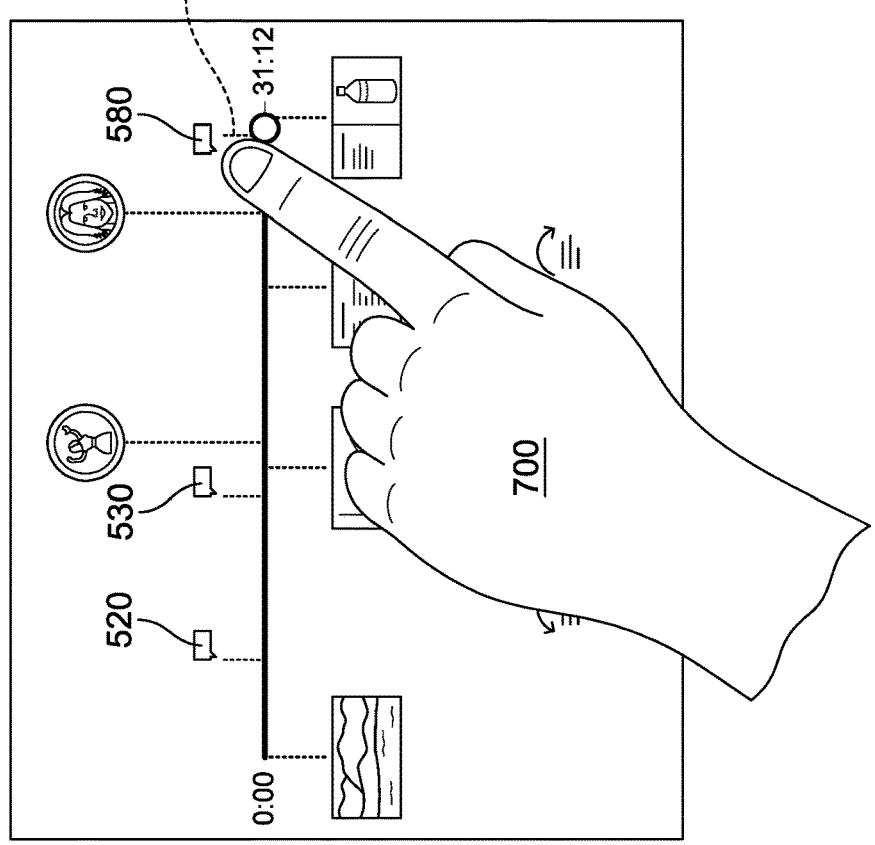
FIG. 7B
FIG. 7A

SYSTEM AND MANAGEMENT OF SEMANTIC INDICATORS DURING DOCUMENT PRESENTATIONS

CROSS-REFERENCE TO RELATED APPLICATION

This application claims the benefit of priority from pending U.S. patent application Ser. No. 16/193,082, filed on Nov. 16, 2018, and entitled "System and Management of Semantic Indicators During Document Presentations." The entire contents of the above-referenced application is incorporated herein by reference.

BACKGROUND

Electronic devices, including portable electronic devices, have gained widespread use and are now configured to provide a variety of functions including, for example, instant messaging, teleconference capability, and other personal information manager (PIM) application functions. Text-to-speech synthesis can be used in a number of applications to convert normal language text into speech, and can be implemented in software or hardware. For example, those who are engaged in an activity that restricts their ability to read text may use text-to-speech systems to have the textual material read to them. The use of text-to-speech synthesis is attractive in portable electronic devices, such as for the reading of email and text messages.

As a further example, in cases where the user is attending to other tasks, such as while driving a car, it becomes highly undesirable for such a user to read any document, and so the user may turn to a text-to-speech synthesis application. However, electronic documents typically contain a variety of digital content types such as text, images, slides, and spreadsheets. The presence of such content elements or units can make the listening experience more challenging for a user. Thus, there remain significant areas for new and improved ideas for the management of speech synthesis of electronic documents, as well as enhancing the ability of a user to comprehend and recall document information conveyed through audio.

SUMMARY

An example system, in accordance with this disclosure, includes at least one processor and one or more computer readable media. The computer readable media include instructions which, when executed by the at least one processor, cause the at least one processor to display, on a first device to a first participant, a first user interface for presentation of audio content, the first user interface including a navigation tool configured to visually represent contextual events in the audio content and a first selectable indicator linked to a second participant, and receive a first user selection of the first selectable indicator. The instructions also cause the at least one processor to initiate, in response to at least the first user selection, a first telecommunication session between the first participant and the second participant.

An example method implemented in a data processing system for navigating through an audio playback of an electronic document includes displaying, on a first device to a first participant, a first user interface for presentation of audio content, the first user interface including a navigation tool configured to visually represent contextual events in the audio content and a first selectable indicator linked to a second participant; receiving a first user selection of the first selectable indicator; and initiating, in response to at least the first user selection, a first telecommunication session between the first participant and the second participant.

An example machine-readable medium on which are stored instructions according to the disclosure includes instructions, which when executed, cause a processor of a programmable device to perform operations of displaying, on a first device to a first participant, a first user interface for presentation of audio content, the first user interface including a navigation tool configured to visually represent contextual events in the audio content and a first selectable indicator linked to a second participant; receiving a first user selection of the first selectable indicator; and initiating, in response to at least the first user selection, a first telecommunication session between the first participant and the second participant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 7A and 7B illustrate the audio navigation tool interface of FIG. 5 where a user is engaging with a commenting option associated with the document;

DETAILED DESCRIPTION

Figure 1:
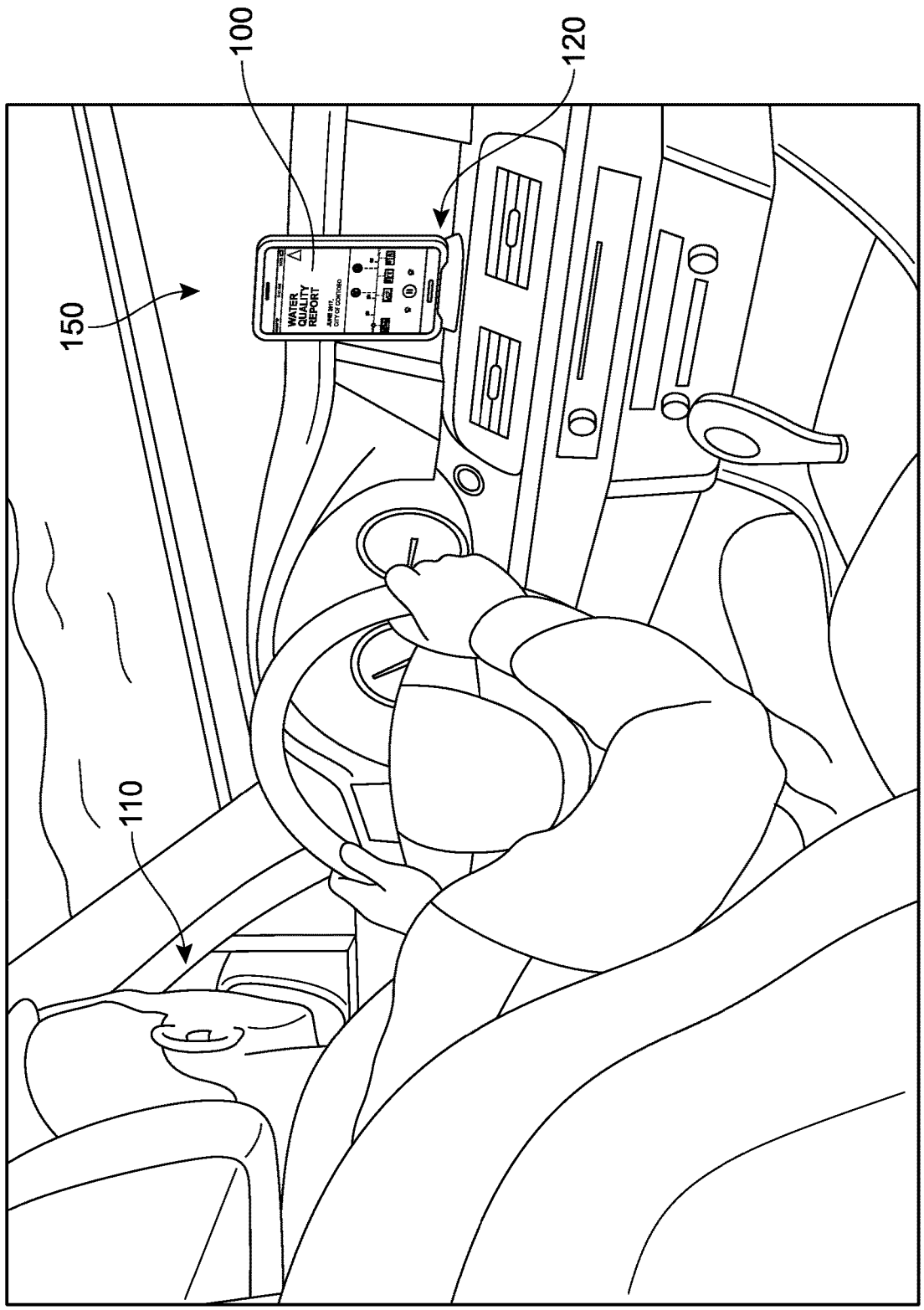
FIG. 1 is an example of a computing environment with an implementation of a document presentation client application.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In traditional media players, such as podcast applications, playback of a document or presentation is centered about a duration of the audio recording (e.g., the running time of the media playback). Any additional context that might have been associated with or attached to the content that is played is typically removed or not presented during the audio presentation. In other words, the document's textual narrative may be recited in a simplistic, chronological-based audio presentation, where users are shown a start time and end time, the overall duration of the audio, and simple buttons that allow for jumps between time (e.g., +10 or −10 seconds). It can be understood that such media players are limited to an audio presentation based on time rather than any semantic elements or attributes of an electronic document. Nevertheless, electronic documents or other media often include or are associated with semantic attributes that can be important to a user and increase their understanding of the presented material, and their absence may be of significant detriment to a listener.

The following implementations introduce an electronic document semantics management system and process for facilitating a user's listening and comprehension experience, and providing tools that can allow listeners to better orient themselves and receive and absorb critical information contained in the document. For example, a user can access and hear comments that have been inserted into or added to the document through use of the proposed systems. This can occur during their listening experience, and the user can easily be returned to the playback after the comment has been heard, or the listener can request a communication session with the person who added the comment. Furthermore, rather than providing navigation options that rely on dividing or parceling the playback by period of time (e.g., 10 second intervals, 1 minute intervals, 5 minute intervals), the playback timeline is divided to represent different semantic sections in the document. Unlike traditional players, the 'back' button or 'forward' button will be configured to jump between increments of content, rather than increments of time. In some implementations, the user can also readily view semantic indicators such as slides, graphs, and figures that are linked to specific parts of the playback. Furthermore, a listener may be able to see which other users are also listening to this document in real-time. The first user can then request to be connected to a second listener and share the same audio playback, despite each user being in two different locations, allowing for a collaborative listening experience.

As introduced above, applications such as word processors, publishers, spreadsheets, presentation software, and others can be used to generate electronic documents or content. Generally, the term "electronic document" or "document" includes any digital data that may be presented (e.g., visually or audibly presented), including but not limited to an electronic content item and portions thereof, a media item, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, image documents that include images of text that may be extracted using optical character recognition (OCR) processes, documents that may include mixtures of text and images, such as Portable Document Format (PDF) documents or PowerPoint (PPT) documents, etc., or any type or format of document from which text may be extracted or that may be converted to text, and other digital data. As an example, this electronic content may include word processing documents, spreadsheets, presentations, e-books, or other digital-based media.

Furthermore, within some types of documents, the electronic content can be understood to include a plurality of content elements or content portions. In general, a content portion includes any part of electronic content that is defined or discernable as a part. For example, a content portion may be automatically discerned from a characteristic of the content portion itself (e.g., a letter, number, word, sentence, paragraph, section, image, symbol, or chapter of an electronic document, or other file format designation) or may be manually defined by a reviewer or end-user (e.g., selected collection of words in an electronic document, a selected portion of a digital image, a selected group of cells in a spreadsheet, a selected region in a slide from a presentation). Examples of content portions include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

In addition, a user or participant generally refers to one who views, develops, collaborates, suggests, listens, receives, shares, reviews, revises, or disseminates pieces of electronic content, including the creation, viewing, or updating of comments associated with the electronic content. A user includes a reader or listener of electronic content based application programs, as well as a user of the apparatus and systems described herein. Furthermore, the term "software application", "software", or "application" refers to a computer program that performs useful work, generally unrelated to the computer itself. Some non-limiting examples of software applications include text-to-speech applications, speech synthesizer applications, word processors, spreadsheets, slideshows, presentation design applications, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, Powerpoint®, Excel®, Visio®, Skype®, Teams®), Office 365®, Microsoft 365®, and other suites or applications can offer a variety of teleconferencing, text generation, presentation, and commenting tools. In other implementations, Google Sheets® and Google Slides®, or another word processing or data presentation program, such as Apple Pages®, Corel WordPerfect®, Google Docs®, IBM Lotus Word Pro® or other software applications within the Microsoft Office Suite® or array of Microsoft® products as well as any non-Microsoft® based applications may be used. These are non-limiting examples, and any other electronic content creation, editing, or collaboration application may benefit from the disclosed implementations. Throughout this description, the software application that is used to originally create or normally view (e.g., on a desktop) the electronic content will be referred to as the native application.

Furthermore, as a reader accesses and/or listens to a document, they may be slowed or perplexed in cases where there are large numbers of content events or what seem to be disjointed recitations as the document moves from one topic or section to another, particularly if the document is large or covers a range of information types. In some cases, the 'big picture' message of a document or file may be obscured as the user is bombarded with long stretches of recited text with little or no indication of structure or context. As will be described below, the proposed system provides both individual and group users the ability to more precisely communicate, share, receive, and appreciate electronic content, as well as a more comprehensive and intuitive sense of the ideas contained in their documents. This in turn can improve the ability of individuals to manage their consumption of electronic documents and facilitate a more natural and effective absorption or recall of the information contained in such documents. As will be discussed below, these systems and methods can also offer an effective set of communication tools for connecting with other readers (or listeners) of the document and enrich their overall listening experience.

Semantic attributes can be generally understood to refer to aspects of an electronic document that provide or increase contextual understanding of the described material, and/or can facilitate comprehension of relationship(s) between various content elements. Semantic attributes can allow for different levels of meaning to be added to a document, and are frequently non-textual in nature or manifestation. In other words, while the document itself conveys a great deal of information via text, other aspects can be significant with respect to the comprehension of such text. As some non-limiting examples, semantic attributes can include the use and placement of a title, subtitle, bibliography, dates, author names, table of contents, bullet lists, numbered sections, citation indications, references, formatting (e.g., underline, bold, italic, font type, highlighting, etc.), tables, borders, footnotes, headers, footers, graphs, icons, symbols, images, font size, indentation, alignment, line and paragraph spacing, margins, white space, symbols, color usage, brightness, narrative components, and other such details. For the most part, semantic attributes can be appearance-based or serve as visual cues that—for a reader viewing the document— quickly convey information beyond the text itself. However, in other implementations, sematic attributes can also be auditory or haptic-based, or can be an integral part of the text.

It can be appreciated that documents conveyed to a user via a conventional audio playback or text to speech system will normally be unable to provide an indication of any of these semantic attributes, resulting in a significant burden and confusion for the listener. For example, a typical narration process recites ideas and relies on listeners to recall the previous information, and/or requires them to jump forward or backward in time to search for a place in the document that was meaningful or that they would like to hear again. In contrast, the systems described herein offer users the ability to hear textual narration while also enjoying the use of tools that permit semantic-based navigation and perusal throughout the narration.

In order to better introduce the systems and methods to the reader, FIG. 1 presents a high-level example of a representative computing environment ("environment") 150 for implementing an electronic content semantic management system. In different implementations, the environment 150 can include one or more computing device end-users, or simply "users". One or more users can interact with or manipulate data presented via a user device. The various features and activities illustrated in FIGS. 1 and 2 are described generally, with further details and examples presented in connection with later figures.

As an example, a first user 110 is shown in FIG. 1. In this case, the first user 110 is a driver of a vehicle, and is accessing a document presentation client application ("presentation client") 100 on a first device 120, represented by a user interface in this example. The first device 120 shown here is a mobile phone. However, in other implementations, the device may be a personal computer such as a desktop or laptop computer, a tablet, or any other computer system having access to electronic documents. The first device 120 executes an operating system such as Microsoft Windows®, Mac OS®, Unix®, or other operating system, and includes memory, storage, a network interface, and other computer hardware not illustrated herein. The first device 120 can be configured to respond to instructions generated by the presentation client 100. In FIG. 1, only one device is shown, but any number of devices may be used to access an electronic document among many users (see for example, FIGS. 6A-6C). In addition, in some implementations, the first device 120 can be connected to a server, or an online or cloud-based computing storage service ("cloud storage service"). As first user 110 accesses or interacts with electronic documents via first device 120, various content or metadata associated with the document may be updated, transmitted, received, or saved in the cloud storage through a network connection.

With reference to FIG. 1, in different implementations, a user may be engaged in an activity that limits or restricts their ability to read text on their device. The driver in this case is occupied with the task of safely operating the vehicle toward a desired destination. However, prior to or during this activity, the first user 110 becomes notified (e.g., via first device 120) or is otherwise aware of a message or electronic communication that includes an electronic text-based content or document. In some implementations, the first user 110 can input a request, instruction, or command to the presentation client 100 to initiate a playback experience of the document. In another implementation, the user can have previously established settings that automatically initiate document playback upon receipt of a document. The term "playback" or document "playback experience" will generally refer to the delivery of synthesized speech or other audio corresponding to the content of the document to a user, as well as any corresponding audio-visual indicators (as will be described below) via the presentation client 100. Thus, though the term "audio content" may be used throughout this description to generally describe a soundscape associated with a document, the term may also be understood to describe other aspects of the playback experience as displayed or presented by the presentation client, including visual content or symbols. The presentation client 100 can be configured to play the document and present the associated visual indicators, or may access or utilize another application to provide the auditory content while presenting visual indicators. A user can then benefit from the arrangement in which he or she may safely and efficiently engage in multiple tasks.

Figure 2:
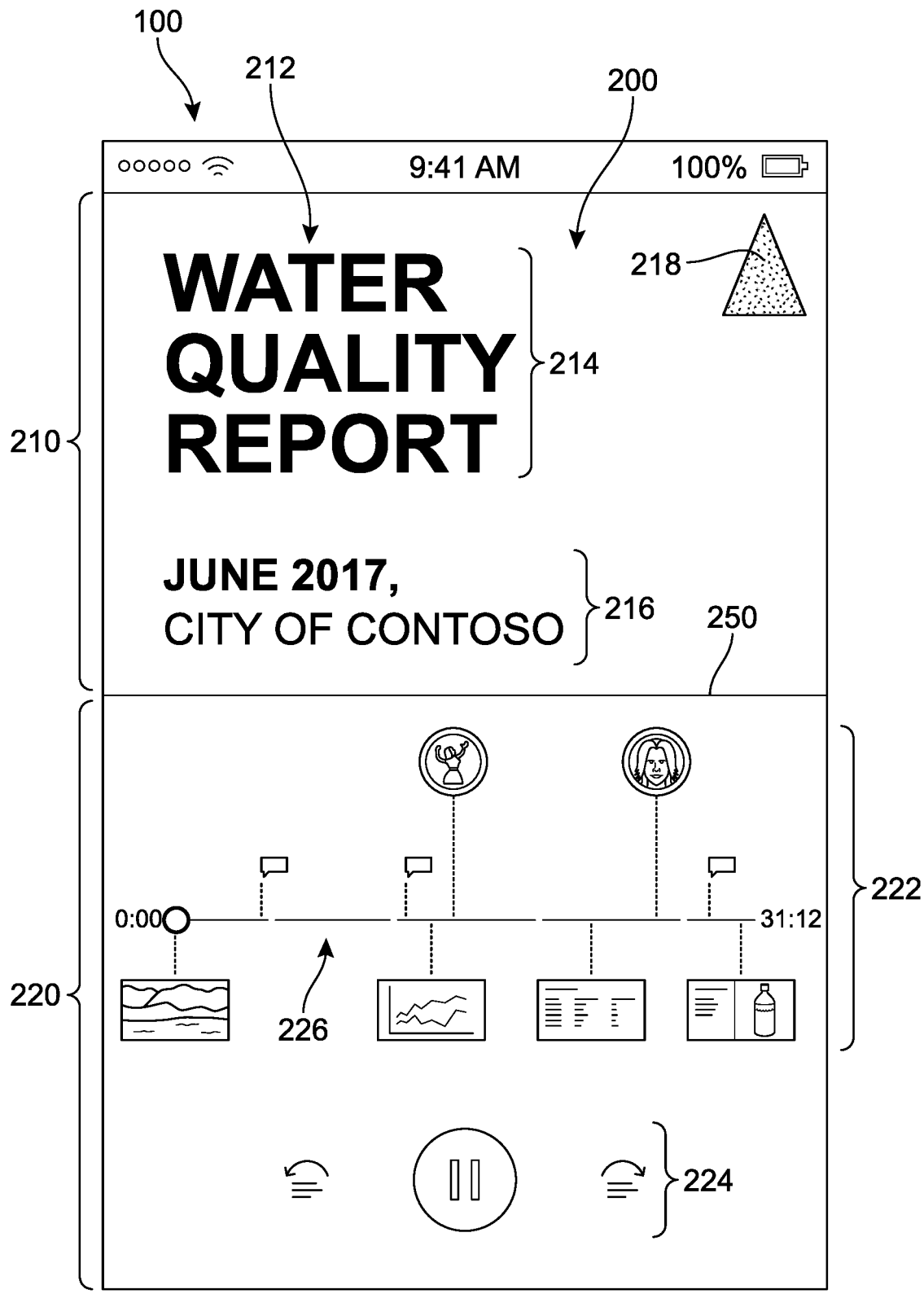
FIG. 2 is a computing display illustrating an implementation of a document presentation user interface offering a plurality of options for navigating audio narration of the document.

In FIG. 2, a larger, magnified view of an implementation of a user interface ("interface") 200 that may be displayed during use of the presentation client 100 is depicted. In general, an "interface" can be understood to refer to a mechanism for communicating content through a client application to an application user. For example, interfaces may include pop-up windows that may be presented to a user via native application user interfaces (UIs), controls, actuatable interfaces, interactive buttons, or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application.

In addition, a "native control" refers to a mechanism for communicating content through a client application to an application user. For example, native controls may include actuatable or selectable options or "buttons" that may be presented to a user via native application UIs, touch-screen access points, menus items, or other virtual objects that may be shown to a user through native application UIs or segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click or selection of a button or other native application object, video associated with a user interface, or other such information presentation.

The interface 200 shown in FIG. 2 includes a display region 210 and a navigation tool region ("navigation region") 220. Other implementations may include additional interface regions, or fewer. While the functionality offered by these regions will be discussed in greater detail below, in general it can be understood that the display region 210 is configured to showcase visual content associated with the electronic document. In FIG. 2, the display region 210 presents a plurality of text 212 that includes as a title 214 and a subtitle 216 (shown in smaller lettering size relative to the title 214). In addition, in some implementations, a first selectable mode option 218 can be provided. The display region 210 will be discussed further with reference to FIGS. 3 and 4.

The adjacent navigation tool region 220 includes a document transition menu 224 as well as an audio navigation and reference tool ("audio navigation tool") 222 that is configured to visually represent the document text as well as any contextual events relative to the audio presentation of the document. A contextual event can generally be understood to refer to a portion of content in the document that has been determined to contain, signify, or otherwise be associated with a meaningful, noteworthy, key, important, significant, or substantial semantic attribute. A contextual event may help a user or reader better navigate the document or remain aware of key concepts or events in the document.

The audio navigation tool 222 includes a plurality of selectable indicators that are associated with various points or sections of the document being narrated and visually represented by the audio navigation tool 222. In different implementations, the audio navigation tool 222 can include an 'event-line' (in contrast to a timeline) that characterizes points in the audio and/or demarcates audio segments in the audio by indicators of significant semantic attribute events (rather than intervals of time). While FIG. 2 shows an event-line 226 as a substantially elongated line, bar, or strip, it should be understood that the presentation of the audio segments can include any other type of symbol or image, such as but not limited to a waveform, graph, chart, or any other illustration configured to display or navigate events that occur during narration of a document. Each of the audio navigation tool 222 and the adjacent document transition menu 224 will be discussed in greater detail with reference to FIGS. 5-8 below. Furthermore, while the specific relative locations of the display region 210 and navigation region 220 represented in FIG. 2 are intended to underscore the relationship of the visual content with the audio signals, it should be understood that in other implementations, each region or feature of the interface 200 may be displayed or generated anywhere else on the screen(s) associated with the client's system, may be hidden, minimized, overlaid, closed, or concealed, and/or may be spaced apart from, adjacent to, or around the main window of the interface.

As noted above, in different implementations, display region 210 can provide a kind of exhibition space in which the system may present a wide range of relevant visual content associated with the electronic document. The display region 210 can in some cases offer visual affordances to aid an audience in better discerning their location in the document, and/or to confirm whether the audio playback was heard correctly. In some implementations, the system can include provisions for adjusting the size the display region 210 or its proportion relative to the rest of the interface 200 in order to better accommodate different types of information and/or ensure the information is presented in a size easily visible to a user even in quick or brief glances. As one example, the interface 100 may include a button or input means that allows a user to expand or otherwise adjust the size of the display region 210 relative to the navigation region 220 (e.g., via selectin of first selectable mode option 218 in FIG. 2).

In some cases, the navigation region 220 introduced in FIG. 2 can be minimized or otherwise be decreased in size, and the display region 210 can fill or expand into the newly available space. In one implementation, the switch from a first mode (e.g., where both the display region 210 and the navigation region 220 are shown, as in FIG. 2) to a second mode (e.g., where the navigation region is minimized and the display region 210 expanded, as in FIG. 3) can occur automatically after a particular duration (default or custom) of inactivity by a user while document playback is occurring. In other implementations, this can result more directly or immediately following a request or command by a user. In one implementation, a user 'tap' on any 'blank' space in the interface can be configured to trigger a switch between the two modes. In another implementation, a user may request the switch by a voice or other type of command.

Figure 3:
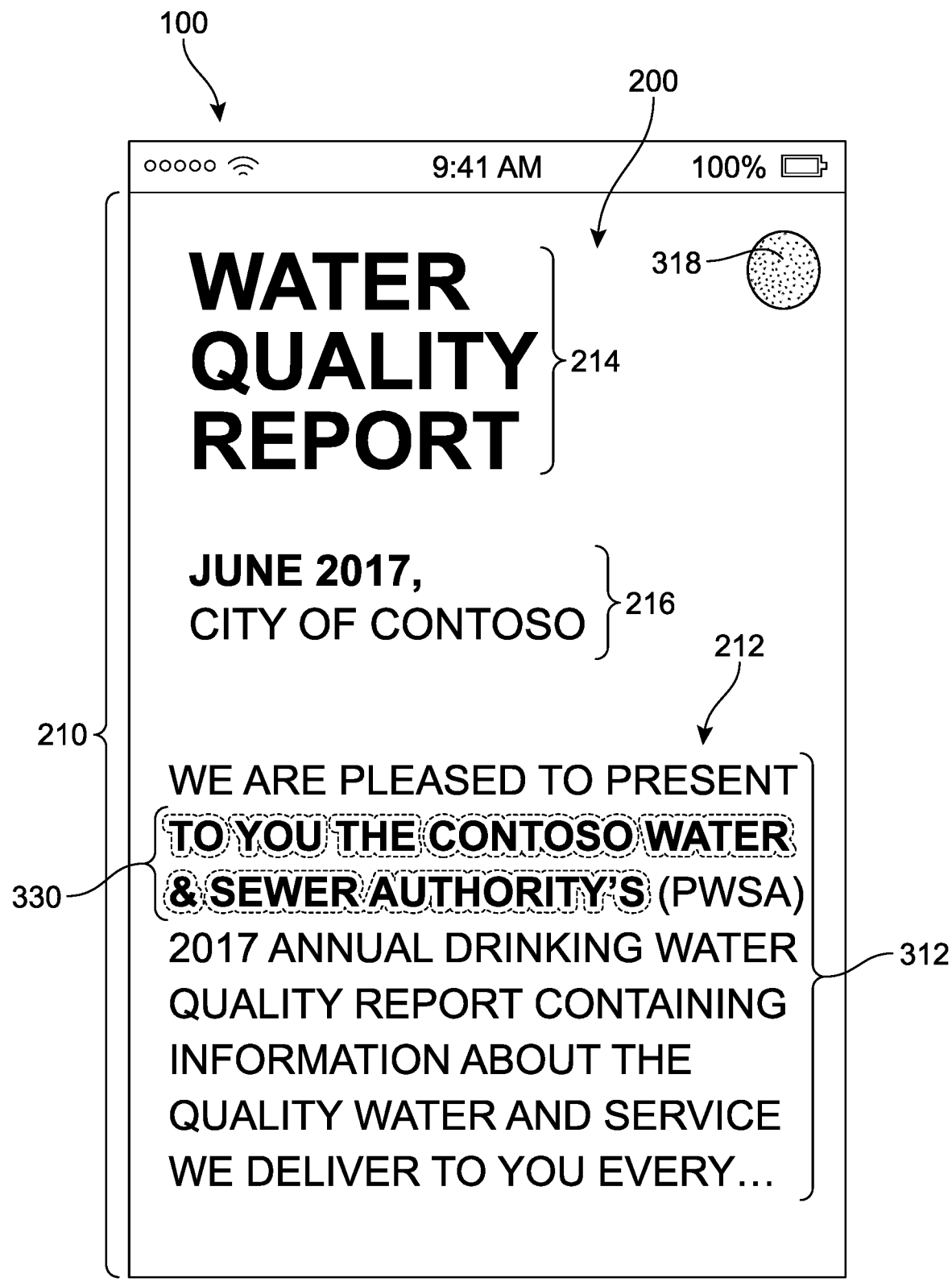
FIG. 3 is a computing display illustrating an implementation of a document presentation user interface configured to showcase visual content associated with a document.

In FIG. 2, the interface 200 includes a non-limiting example of such an input means. The first selectable mode option 218, when selected, actuated, activated, or enabled, can trigger a transition of the interface 200 to a full-screen display mode 300, as shown in FIG. 3. While for purposes of simplicity the switch illustrated in this example is one where the navigation region 220 is no longer apparent, it should be understood that in other implementations the size of the display region 210 can be adjusted more selectively, for example, referring back to FIG. 2, an intermediate indicator 250 may be selectable, drag-able or scroll-able, such that a user can pull or slide the intermediate indicator 250 up or down to increase or decrease the proportion of the screen dedicated to each region. Furthermore, in other implementations, additional functionality or regions may be included in the interface 200 and corresponding regions adjusted in size accordingly.

In the full-screen display mode 300 example of FIG. 3, the display region 210 encompasses a substantial entirety of the interface window. Below the title 214 and subtitle 216 it can be seen that the plurality of text 212 further includes document body text 312. The document body text 312 can be understood to refer to the larger or primary textual content of a document, such as the main body, or details of a narrative. The body text 312 can in some implementations also be displayed in a smaller lettering size relative to the title 214 and/or subtitle 216. Furthermore, as document playback begins, in some implementations, the portion of the plurality of text 212 that is being read, about to be read, or was just read in the last few seconds can be highlighted 330 to help a reader identify the content being spoken via a quick glance if needed, as well as easily 'locate' themselves in the document.

Figure 4B:
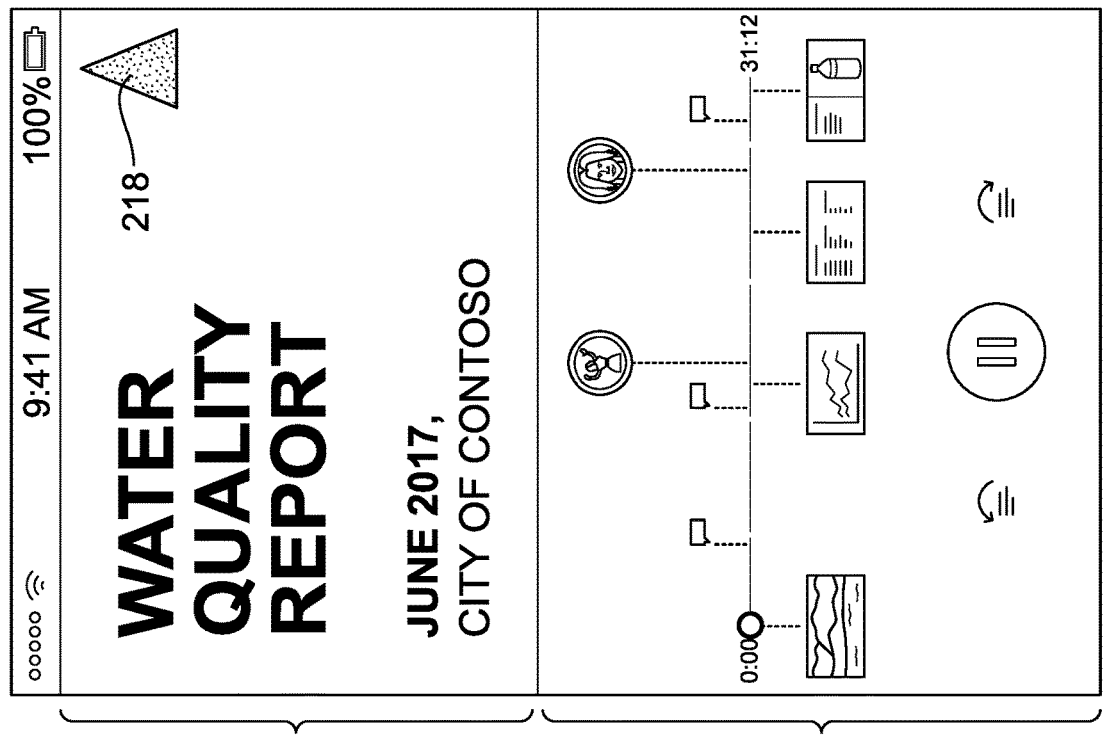
FIGS. 4A and 4B are computing displays illustrating an implementation of a document presentation user interface with an option to switch between display modes.
Figure 4A:
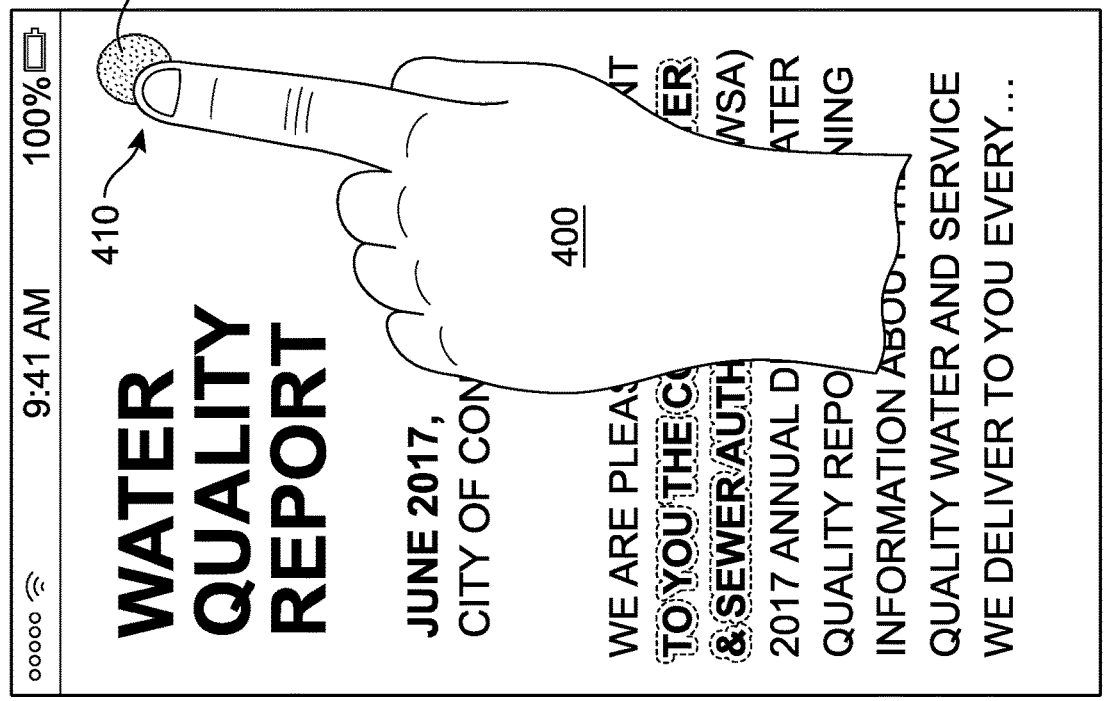

In some implementations, a second selectable mode option 318 can be provided to enable a user to switch back from the second mode of FIG. 3 to the first mode of FIG. 2. This is demonstrated in the example of FIGS. 4A and 4B. In FIG. 4A, a user (represented by a hand 400) is submitting a request via input 410 corresponding to the second selectable mode option 318. Upon receiving this input 410, the system can switch or revert back to the first mode, as shown in FIG. 4B, offering the user direct access to the audio navigation tools. In some implementations, the interface may conversely also be configured to expand the navigation region 220 and minimize the display region 210.

Figure 5:
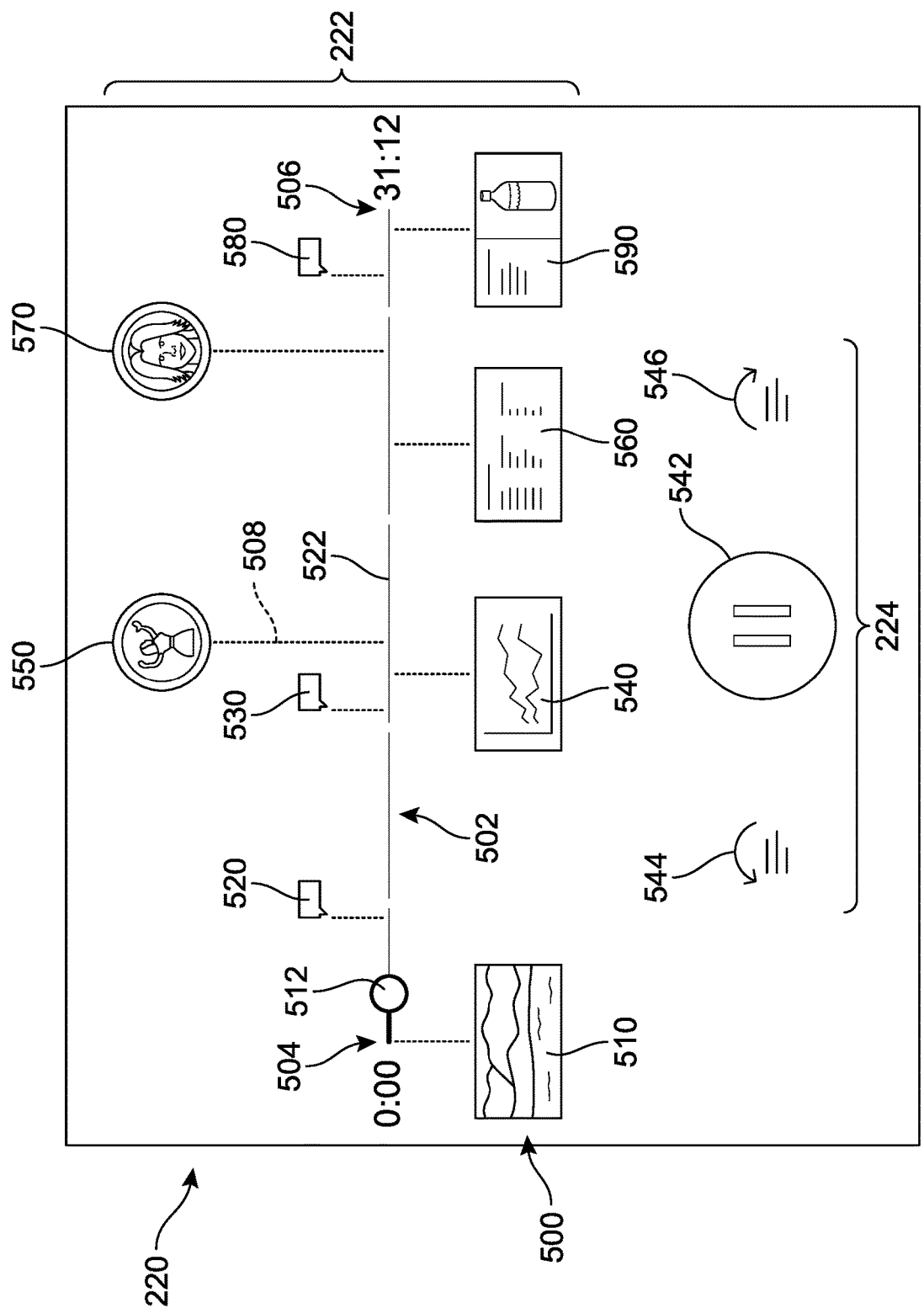
FIG. 5 is a portion of a computing display illustrating an implementation of an audio navigation tool interface with a plurality of selectable indicators corresponding to significant content events in a document.

In order to allow the reader to better appreciate the systems described herein, an implementation of the navigation region 220 will now be discussed in greater detail. Referring to FIG. 5, an isolated view of the navigation region 220 is shown for purposes of clarity. The navigation region 220 includes audio navigation tool 222 and document transition menu 224. The audio navigation tool 222 can provide users with a pictorial overview of some or all of the semantic attributes of a document relative to its audio playback. In addition, as shown in FIG. 5, the audio navigation tool 222 can include a plurality of indicators 500. In different implementations, these indicators 500 can represent a variety of different contextual events in the audio content. In addition, in some implementations, one or more indicators 500 can be selectable (e.g., serve as a selectable or actuatable button or option), such that a user input can select an indicator and trigger an action that is linked to that indicator.

In the example of FIG. 5, the audio navigation tool 222 includes a first indicator 510, a second indicator 520, a third indicator 530, a fourth indicator 540, a fifth indicator 550, a sixth indicator 560, a seventh indicator 570, an eighth indicator 580, and a ninth indicator 590, each associated with or mapped to an event-line 502 extending between a first end 504 and a second end 506. In some implementations, the indicators can be mapped to the event-line 502 via an audiomarker 508 (shown here by dotted lines). In addition, the event-line 502, while primarily a navigation tool based on contextual events, can include time-based features as well. For example, the first end 504 can represent an initial or start time (here 0:00) and the opposite, second end 506 can represent a stop or end time (here, 31:12) of the document playback.

In some implementations, the system can include provisions to visually distinguish the content that has been played relative to content that has not yet been played. In this example, a darker, bolder, or thicker line serves this purpose, though in other implementations, varying color, shading, shape, lighting, or other marks can be used. Furthermore, a current position marker 512 (shown here as a round symbol) can indicate where the user is currently in the playback, or the last listened location. Other implementations can use different symbols or visual cues to represent the current playback status. Thus, in some implementations, if a user 'skips around' or jumps between segments, there may be several regions of 'played' content (thickened lines) interspersed with unplayed content, and the current position marker 512 can simply indicate to the user where they last left off their playback experience.

In different implementations, the interface can present different types or categories of indicators to reflect different actions or contextual events that are linked to or represented by that indicator. As an example, the first indicator 510, fourth indicator 540, sixth indicator 560, and ninth indicator 590 each correspond to a first event category, the second indicator 520, third indicator 530, and the eighth indicator 580 each correspond to a second event category, and the fifth indicator 550 and seventh indicator 570 each correspond to a third event category. In this case, the first event category refers to a visual content event, such as an image, graph, slide, graphic, or other primarily non-textual piece of data, classified or identified by the system as providing a significant semantic attribute within the document (see for example, FIGS. 8A and 8B below). The second event category refers to a comment event, such as a user-added note or annotation that is added to a specific or specified portion of the document (see for example, FIGS. 7A and 7B below). The third event category refers to a collaborator, co-user, or co-participant emblem, which can indicate the last known content listened to by another user, and/or another user's current position and listening status, as well as provide access to additional user profile information, if such information is available (see for example, FIGS. 6A-6C below).

It can be understood that many other types of event categories can be presented to users, including but not limited to personal highlights, keywords, voice-added bookmarks, underlining, or other marks or events inserted into or associated with a portion of the document. For example, a user may interact with the application via voice commands (e.g. via MicrosoftCortana®, Apple Siri®, Amazon Alexa®, GoogleAssistant®, etc.) to add a comment, add a note to the last sentence, jump back to a previous sentence, request the application to repeat recitation of or display of the first few words of the last sentence to confirm this is the sentence desired for association with a marker or comment, and/or add a marker to any non-textual content or images (as some non-limiting examples) that he or she wishes to view in greater detail later. Some of these types of indicators can serve as persistent visual reminders or notifications, helping users recognize when the audio is moving toward or referencing a figure or drawing for example, or alerting the reader that a key element or important point is associated with this (or upcoming) part of the content. In some other implementations, indicators can help an audience interact with or understand other types of meta-level information for the document.

Furthermore, in different implementations, the event-line 502 can be substantially continuous, or can be broken or interrupted into a plurality of audio segments 522. Each audio segment can represent distinct portions of document content. For example, each audio segment can be configured to represent an interval of content that is contained in a single chapter, a volume, one or more paragraph(s), page(s), slide(s), or some other specifically delineated portion of the content. The use of or basis for such segments can be automatically applied by the system (e.g., default), or can be customized or selected by a user as desired. In some implementations, when a user requests to jump forward or backward through the audio content, or to skip an audio segment, an audible cue may be emitted that confirms to the user that the shift has occurred. Similar audio cues can be added to indicate the start of a new section or chapter, or the end of a specific portion, or any other feature execution.

In some implementations, the application can include provisions for facilitating user movement through a document or otherwise control of the presentation. For example, in FIG. 5, the document transition menu 224 can include a plurality of options for controlling the flow of audio. In this case, the document transition menu 224 includes a play/pause button 542, a rewind/back button 544, and a forward/skip button 546. The play/pause button 542 can be used to stop or temporarily interrupt the playback experience, the rewind/back button 544 can be used to move or return to previous content, and the forward/skip button 546 can be used to move or jump ahead to upcoming content. The document transition menu 224 will be discussed in greater detail with reference to FIGS. 9A-9D.

As noted earlier, the systems described herein can include provisions for communicating with others who access and/or listen to a document to better facilitate collaboration and augment the listening experience. There are many circumstances in which users (e.g., readers or listeners) of a document may wish, despite being engaged in non-office, traveling, or other activities that make reading challenging, to share a listening experience in real-time with one or more other colleagues or users. In addition, organizations can derive a number of benefits by providing or using a platform by which an electronic document may be shared automatically across multiple locations as an audio presentation. Such a tool can move a group or company more effectively towards its goals by smoothing the path toward sharing ideas and facilitating open sharing of information and interpersonal communications, so that each collaborator can work at their most effective level and optimize resource usage. In contrast, when employees are only able to read or listen to materials in individual 'silos', more time and effort is needed for teams to reach a shared understanding of a particular project or task. Implementations of the proposed systems can offer users a much greater degree of flexibility by enabling employees to work more freely than the traditional 9-to-5 office day while still exchanging ideas. Many end users will be able to rely on this type of interface to work with colleagues while at home as well as on the road, leading to an optimal usage of time and greater efficiency and effectiveness. Furthermore, such mobile collaboration technology allows groups to take advantage of sudden bursts of creativity and productivity, rather than confining them to office or desktop environments for document reviews. In addition, these tools can increase collaborative learning opportunities and create more natural mentor-mentee relationships (for example, between newer employees and more experienced coworkers).

Figure 6B:
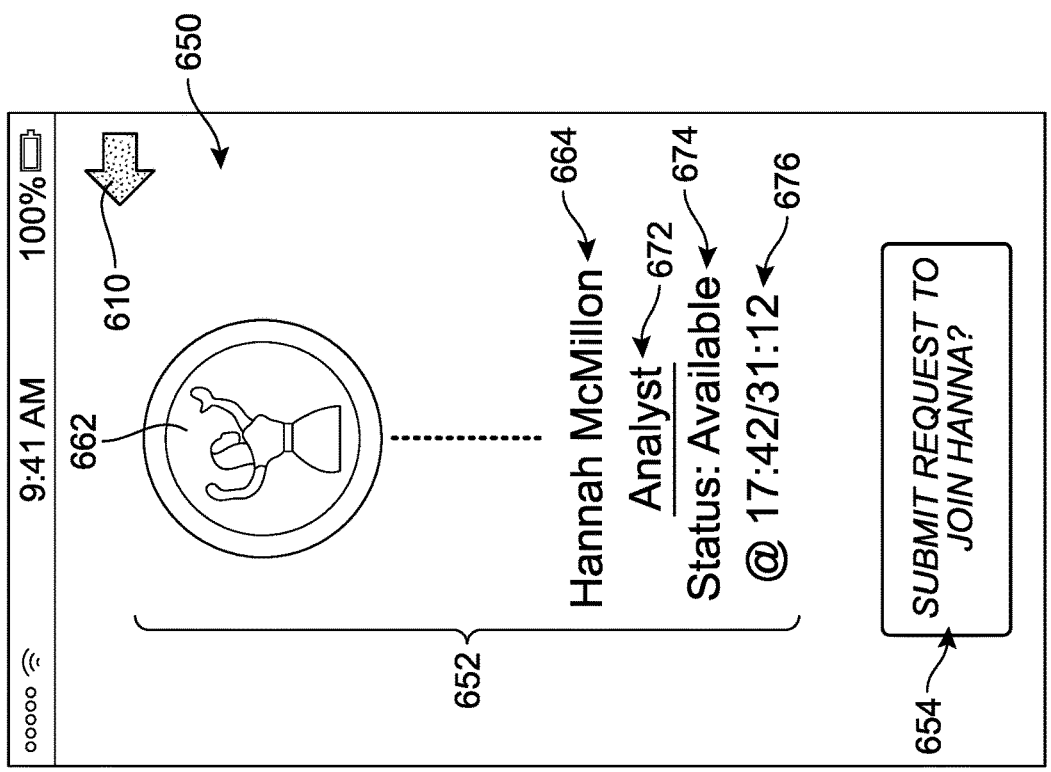
FIGS. 6A and 6B illustrate the audio navigation tool interface of FIG. 5 where a user is engaging with a communication option associated with the document.
Figure 6A:
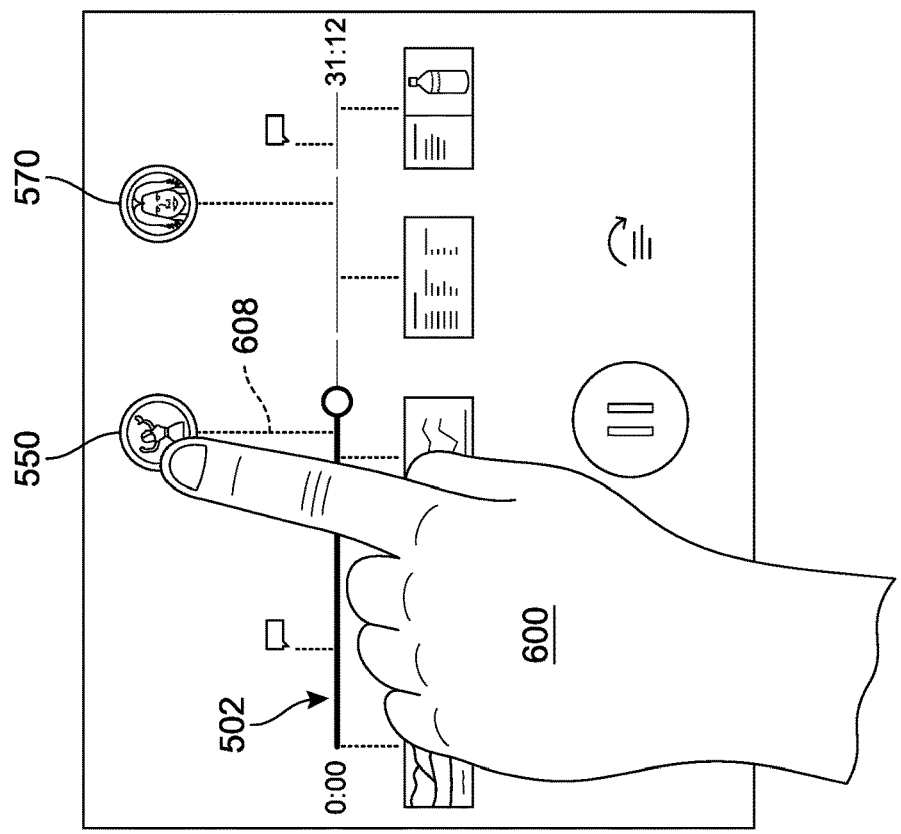
Figure 6C:
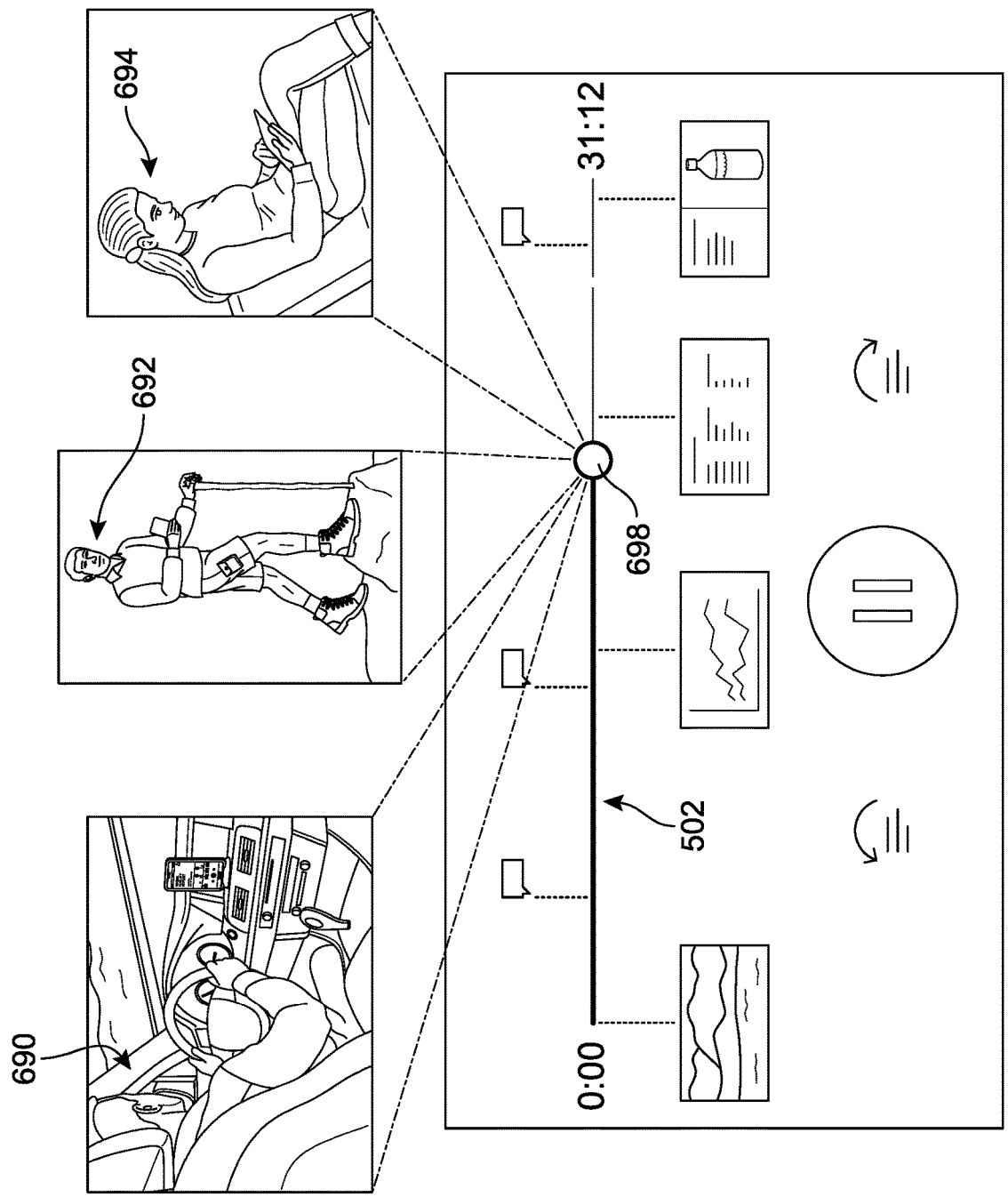
FIG. 6C is a representation of an implementation of a shared listening experience of a document.

Referring now to FIGS. 6A-6C, one example of communication features that may be available during use of the interface is illustrated. In FIG. 6A, a first participant (represented by a hand 600) is providing an input to the application via a first device, thereby selecting the fifth indicator 550. The fifth indicator 550 (as well as the seventh indicator 570) in this example is a selectable indicator that is linked to another user account and/or denotes the presence of a second (remote) participant also currently listening to the audio content (via a second device). This type of indicator may also be referred to as a collaborator alert or notification. Upon receiving a selection of the fifth indicator 550, the interface can present a user communication menu 650 to the first participant, as illustrated in FIG. 6B, where the previous 'home screen' default display has been replaced or at least partly obscured or overlaid by new options.

In FIG. 6B, the user communication menu 650, presented in response to the previous user selection, includes a profile section 652 and a contact option 654. The profile section 652 can include varying information in different implementations, but generally may include a user profile picture 662, a user name 664, user position 672, user status 674 (e.g., whether the user is currently online or offline (or unavailable)), a current user listening point 676 in audio (this can be updated in real-time as the second participant continues listening to the document). Other information, such as but not limited to user previous activity, messages exchanged with this user, user profile notes or updates, user telephone number(s), user chat name, user webpage, user resume or CV, previous positions within the organization, the last time the user was active online and/or active with respect to the current content, the duration of time that this user has engaged with this content, the number of times this user has accessed this content, previous electronic content items the user has authored or collaborated on, projects or content that are currently being authored by this user, and/or other user-specific data, can also be provided. This information can be harvested automatically from various user account repositories and/or can have been inputted by the user themselves. This or other profile information can help a reader identify the user and/or determine whether they wish to contact this listener. A user may also opt to return to the main menu or previous display screen by a "Back" option 610 in some implementations.

In response to a user selection of the contact option 654, the system can be configured to automatically initiate a communication session between the first participant and the second participant, thereby joining them both in a teleconference. For example, the second participant (recipient) can receive a communication request message or alert via their designated computing device. This message can be configured to receive a user authorization to connect the first participant with the second participant in a teleconference. This may occur via the client application(s) and corresponding network connection, and/or access of other telecommunication applications on the computing devices or accessed online.

Upon receiving authorization, the system can join the participants in a shared listening experience. Generally, a "shared listening experience" can be understood to occur when two users in different locations are linked via a telecommunications session while each is accessing audio for the same document. In other words, two or more individuals in locations remote from one another can, in real-time, experience the audio presentation for a document. In order for this to occur harmoniously, in some implementations, the system can be configured to automatically synchronize the audio presentation between the two or more individuals when a telecommunications session between individuals across different devices is initiated.

In different implementations, synchronization refers to the process in which the different user devices are 'locked together' and follow the timing data from a 'master' system or device, such that audio and visual operations associated with the document are coordinated. In one implementation, playback of the audio content between a first user's device and a second user's device are automatically synchronized when the telecommunication session is initiated between the two devices. Whether the synchronization occurs to match the first user's current listening point, the second user's listening point, or another playback point, can be determined by each user's settings and/or can be adjusted by either user prior to the teleconference or during the teleconference.

In some implementations, in order for a first participant to better determine whether a shared listening experience is desirable, there can be provisions by which the first participant can quickly view or otherwise ascertain (a) whether the second participant is listening to the same selected document at this time, (b) whether the second participant is available for a shared listening experience, and/or (c) what point in the playback the second participant is currently listening to. In other implementations, additional or other information can be provided to the first participant, including but not limited to whether the second participant is currently in a shared listening experience with a third (or other) participant(s), and if so who else is participating in that communication session, whether the second participant and the first participant have shared a listening experience previously, and other information that can guide the first participant's decision to request a teleconference with the second participant.

Referring again to FIG. 6A, it can be seen that the second participant, as symbolized by the fifth indicator 550, is connected to or otherwise associated with a specific point or portion of the event-line 502 by an audiomarker 608. In some implementations, the point at which the indicator is connected to the event-line 502 can also serve as a representation of the current playback 'coordinates' or 'location' of the remote participant within the document presentation. In some implementation, the indicator can move with respect to the event-line 502, in order to remain substantially synchronized to the remote participant's 'location', thereby denoting a current (real-time) playback point for the second (remote) participant. As an example, while the remote participant listens to the document, the indicator can move from a first point to a second point on the event-line, where the first point is closer to the first end (earlier in time) and the second point is closer to the second end (later in time). Alternatively, if the remote participant jumps back or rewinds the playback the indicator on the first user's interface can also jump back to correspond to the new playback point.

In some implementations, such a process can be repeated among other participants. For example, a third participant reviewing the document at a third device may also wish to join the teleconference that is occurring between the first participant and the second participant. In such cases, the third participant can submit a request to join the communication session, which can cause the first user interface to display (on the first device) the request from a third participant to join the teleconference. If the first participant agrees and provides a response authorizing the inclusion of the third participant, the system can automatically connect the third participant to the teleconference by initiation of a second telecommunication session between the third participant and the first and second participants. In some implementations, the request can be submitted to both the first and second participant in order to ensure both participants are amenable to the inclusion of the third participant. Once the third (or other) participant is added, the playback can be automatically synchronized across the three devices, such that all three participants will hear the same audio content at approximately the same time, allowing for a plurality of participants in the shared listening experience.

Alternatively, in some implementations, the first participant and/or the second participant can each (or both) desire to add a third participant to their now-occurring teleconference. One or both of these participants can observe which other users are available (i.e., also currently accessing the same document) as selectable indicators on their respective event-lines, and decide to send a request to a user to join their listening experience. In such cases, the system can automatically cause to be displayed a request in the user interface of the third participant's device. If the third participant assents to the request, this may serve as an authorization to initiate the telecommunication session between the third participant and the first and second participants. In other implementations, one or more of the current participants can be provided with an option to call (and add) the third participant. Once the required authorization is received, the system can automatically initiate a second telecommunication session. In addition, as described above, there will also be automatic synchronization of the playback of the audio content between the first device, the second device, and the third device when the second telecommunication session is initiated.

In FIG. 6C, an example of such a teleconference is illustrated with reference to event-line 502. In this example, a first participant 690, a second participant 692, and a third participant 694 are each shown as listening to the same presentation in a shared listening experience. In other words, the first participant 690 driving her car (e.g., to or from work), the second participant 692 out during a physical activity or exercise (e.g., in their personal time away from the office), as well as the third participant 694 at a remote location outside or away from their desk can each opt to listen to this document together, and also enjoy the convenience of the audio presented in synch across their three devices while a communication channel remains open among them.

In different implementations, a shared current position marker ("shared marker") 698 is also available on the event-line 502 to show what point of the presentation a group is currently listening to. The shared marker 698 can move relative to the event-line 502 as the presentation continues forward (or rewinds or skips between segments). If one participant requests to rewind or jump ahead (forward), the request can be effective across all three devices, ensuring the shared listening experience remains in sync. Similarly, in some implementations, a participant can submit a request to pause the playback across all three devices to ensure their conversation does not interrupt the flow of the audio content, and/or then request that playback continue across the three devices. In another implementation, as soon as a participant speaks and the speech is detected by the system, the system can automatically pause the presentation. Similarly, following a detection of an interval of silence in which it may be assumed that the conversation has been completed, the system can automatically un-pause or continue playback of the presentation. With this type of arrangement, coworkers or other group members can easily discuss different features or salient points as they listen. Group communications like commenting, brainstorming, or questions and conversations in the midst of the presentation become simple and straightforward to maintain.

As noted earlier, the systems described herein can include provisions for viewing and/or listening to comments that have been 'attached' or linked to specific portions of the document to further facilitate collaboration and a shared understanding of the presentation. There are many circumstances in which users (e.g., readers or listeners) of a document may desire accessing comments by others who have also read or listened to the document, or the user may wish to insert their own comments for others to view, and/or for their own personal reference. While the term 'comment' will be used primarily during the discussion herein, it should be understood that user insertion, inclusion, or addition of a 'comment' can broadly refer to many different types of comments, including but not limited to virtual user bookmarks, personal notes, highlights, pagemarkers, reminders, flags, or other external content added by a user that can serve as anchors, beacons, or landmarks during later perusals of the document.

Referring to FIGS. 7A and 7B, an implementation of comment presentation features that can be made available during use of the system are illustrated. In FIG. 7A, a first participant (represented by a hand 700) is provides an input to the application via a first device, thereby selecting the eighth indicator 580. The eighth indicator 580 (as well as the second indicator 520 and third indicator 530) in this example is a selectable indicator that is linked to external content that has been added to the document file but may not be part of the internal document text itself. This can be a comment that was added by the first participant in the past, or by any other user who has accessed the document. The comment being shown can have been inserted by voice while using the interface (e.g., through Microsoft Cortana®), direct typing, or some other input means that occurred at a desktop or while using the native application that originally generated the document. Similarly, the text of a comment that is added through the mobile interface (e.g., via a voice command) can be configured to be viewable upon subsequent display of the document in its 'original' or native format.

Upon receiving a selection of the eighth indicator 580, the interface can present a comment menu 750 to the first participant, as illustrated in FIG. 7B, where the previous 'home screen' display has been replaced or at least partly obscured or overlaid by new options. While the comment is being viewed and/or heard as a result of a selection by a user, in other implementations, a user may opt to have the system automatically read or present all comments available in a document during playback, comments added by a specific participant, comments for a specific segment(s) of the document, or to ignore all comments and only present the document content itself. The order in which the comment will be heard can also be adjusted (i.e., to be presented before the specific content to which the comment is linked, or presented after the specific content to which the comment is linked).

In this example, the comment menu 750, presented in response to the user selection, includes an optional profile section 752 (similar to profile section 652 described above in FIG. 6B), an optional contact option 754, and a comment display region 756 in which the text of the selected comment is at least partly shown. In some implementations, the comment menu 750 can also include a 'play comment' option to initiate a voice reading 790 of the comment, or in some other implementations, a voice reading may begin automatically when the eighth indicator 580 is selected. A user may also opt to return to the main menu or previous display screen by a "Back" option 710 in some implementations.

In implementations that include the contact option 754, a user selection of the contact option 754 can automatically initiate a communication session between the first participant and comment author the second participant. The type of communication session that occurs can vary by user preference or selection, and include a teleconference (see FIGS. 6A-6C), email, instant message, text message, meeting scheduler. In addition, in some implementations, the comment menu may include a "Respond to Comment" option 758, where the user can insert a 'sub-comment'. In other words, the reader may wish to add a response to the comment itself that will also be stored as a thread and/or in association with the eighth indicator 580 and can be visible to others who subsequently view the original comment (or remain private per the user preference).

Referring again to FIG. 7A, it can be seen that the first comment, as symbolized by the eighth indicator 580, is connected to or otherwise associated with a specific point or portion of the event-line 502 by an audiomarker 708. In some implementations, the point at which the indicator is connected to the event-line 502 can also serve as a representation of the specific portion of content at which the comment is directed, and/or at what point during the playback the commenting participant added their comment. In other words, such comment indicators can be positioned on the event-line 502 to symbolize the place in the presentation where the comment content is most relevant. As an example, when a participant is listening to the playback and submits a request to add a comment, the system can record the point in the playback at which the request was made and 'insert' or record the comment such that its corresponding indicator is shown as extending from that specific point. In other implementations, a user can explicitly request that a comment be attached or linked to a specific portion of the document even though the comment request itself occurred during playback of a different portion of the document. For example, the user can request that the comment be added to the point(s) in the document when a specific slide on whales and sea-life was discussed, or when the name "Jane Doe" was mentioned, with the fourth paragraph, 20 minutes into the presentation, five minutes ago, at the point where a second participant is currently listening, or any other place in the presentation. Based at least on the preferences or settings established by the user, one or more of these comments or comment types can be made 'private' (only accessible to the user) or public (available to all users), or limited (accessible to designated or limited types of users).

As noted earlier, the systems described herein can include provisions for viewing and/or listening to specific semantic attributes that are present throughout various portions of the document to assist the reader in their understanding of the presentation. There are many circumstances in which users (e.g., readers or listeners) of a document may wish to view, review, refer to, or otherwise access contextual events in a document that can help to locate them in the presentation and reinforce or bolster their broader impression of the document from the audio content. The term contextual event, as also described above, covers a wide variety of information, and can be distinguished and/or identified as such based on user preferences, data size, data type, formatting, as well as elements that are inserted at the time the document was generated, such as CSS (cascading style sheets) or any other back-end data about the various content in the document that can be used to recognize or classify the content element(s) as potentially meaningful for users (or for a specific user) and/or as a semantic attribute that is significant enough to warrant display of a visual indicator along the event-line.

Figure 8B:
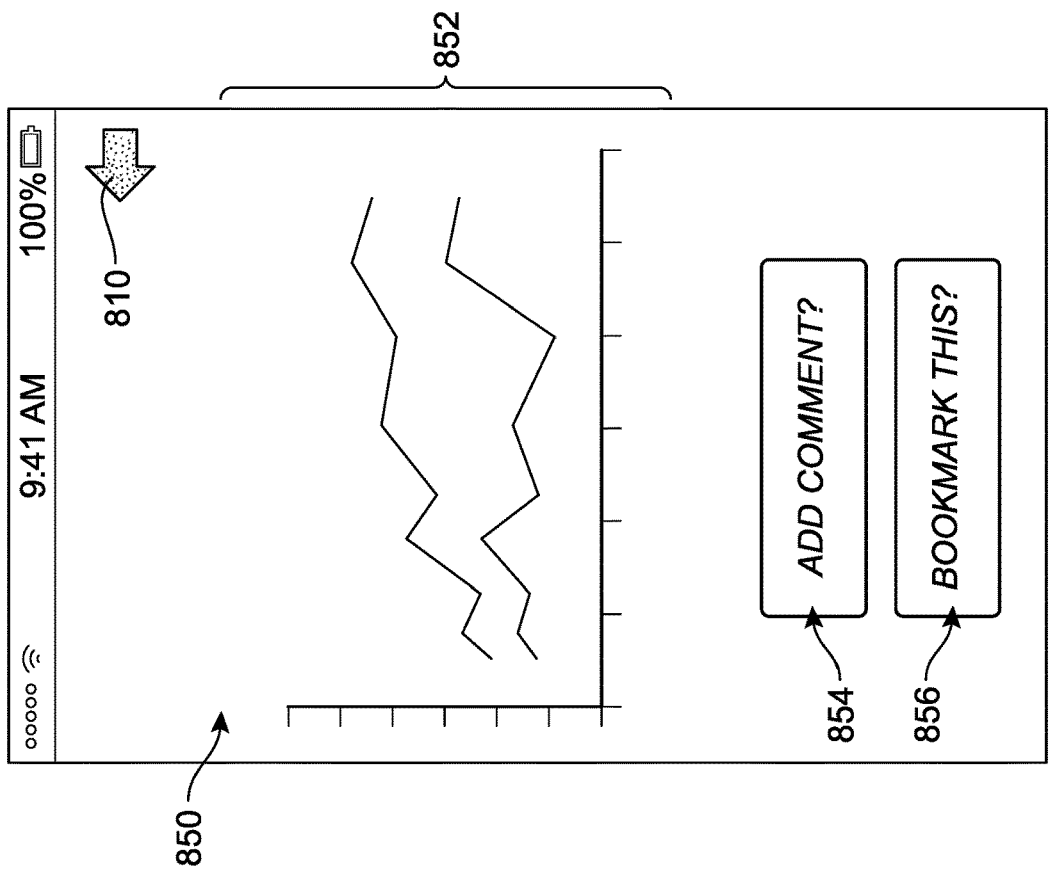
FIGS. 8A and 8B illustrate the audio navigation tool interface of FIG. 5 where a user is engaging with a content event option associated with the document.
Figure 8A:
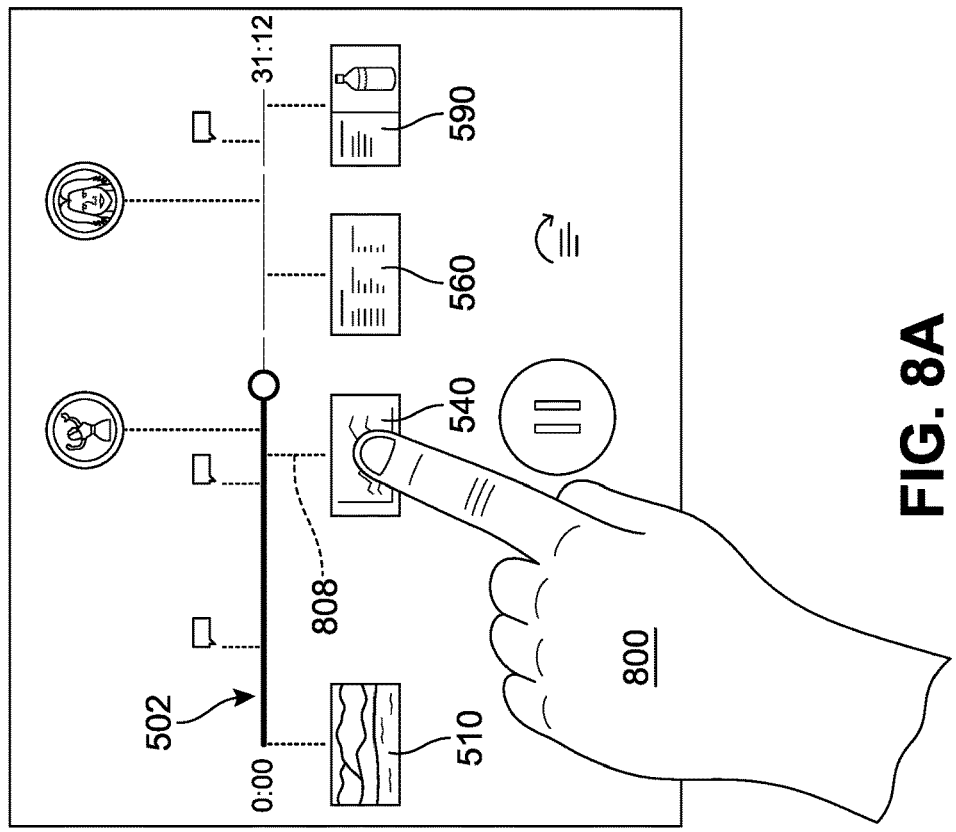

Referring to FIGS. 8A and 8B, an example of contextual event presentation features that can be made available during use of the system are illustrated. In FIG. 8A, a first participant (represented by a hand 800) is depicted providing an input to the application via a first device, and selecting the fourth indicator 540. The fourth indicator 540 (as well as the first indicator 510, sixth indicator 560, and ninth indicator 590) in this example is a selectable indicator that is linked to a visual element found or present in the document content that has been determined to provide a meaningful reference or context for readers of the document, either by the system automatically or as designated by another accessor of the document. The visual element can be an image, slide, schematic, illustration, or any other visual aid that supports, supplements, or expands upon the text or corresponding narration. The contextual event is frequently part of the original document, or created while the document was generated in its 'original' or native format, though in other implementations it can be added to the document at a later time to facilitate the translation from text to speech. Upon receiving a selection of the fourth indicator 540, the interface can present a contextual event menu 850 to the first participant, as illustrated in FIG. 8B, where the previous 'home screen' display has been replaced or at least partly obscured or overlaid by larger view of the corresponding visual element, along with new options. While the visual element is displayed as a result of a selection by a user in this example, in other implementations, a user may opt to have the system automatically present all contextual events available in a document during playback in such a manner, or particular class(es) of contextual events, contextual events for a specific segment(s) of the document, or to ignore all contextual events and only present the document text.

In FIG. 8B, the contextual event menu 850, presented in response to the user selection, includes a visual element display 852 in which at least a portion of the selected visual element is shown, an optional comment option 854, and another optional bookmark option 856. In some implementations, the contextual event menu 850 can also include a 'play' option to initiate a voice reading of any text found in the visual element, or in some other implementations, a voice reading of such text may begin automatically when the fourth indicator 540 is selected. A user may also opt to return to the main menu or previous display screen by a "Back" option 810 in some implementations.

In implementations that include the comment option 854, a user selection of the comment option 854 can automatically begin a recording of the user's voice as they add a comment for associating with the displayed visual element. Similarly, selection of the bookmark option 856 can add a virtual marker to the displayed visual element that can be readily accessed or located at a later time via the current interface or via the native application. For example, in one implementation, a user can simply request a search for all bookmarked visual elements and these will be displayed or identified to the user.

Referring again to FIG. 8A, it can be seen that the first visual element, as symbolized by the fourth indicator 540, is connected to or otherwise associated with a specific point or portion of the event-line 502 by an audiomarker 808. In some implementations, the point at which the indicator is connected to the event-line 502 can also serve as a representation of the specific location in the content at which the visual element is positioned in the document, or at a point corresponding to the place that, during the normal (native) client application display of this document, the visual element is inserted or disposed. In other words, such indicators can be positioned on the event-line 502 to symbolize the place in the presentation where the visual element would be shown if viewed in its native application. The presence of such indicators can help users in the extraction of key elements. For example, as a presentation moves forward, information may be difficult to hold in memory. Users may wish to quickly recap or review key semantic attributes or wish for landmarks that will allow them to recognize and return to specific parts of the presentation 'landscape'. These contextual event indicators facilitate a sense of continuity between each of the audio segments, as well as between the audio presentation of the document and the client application display of the same document.

Figure 9A:
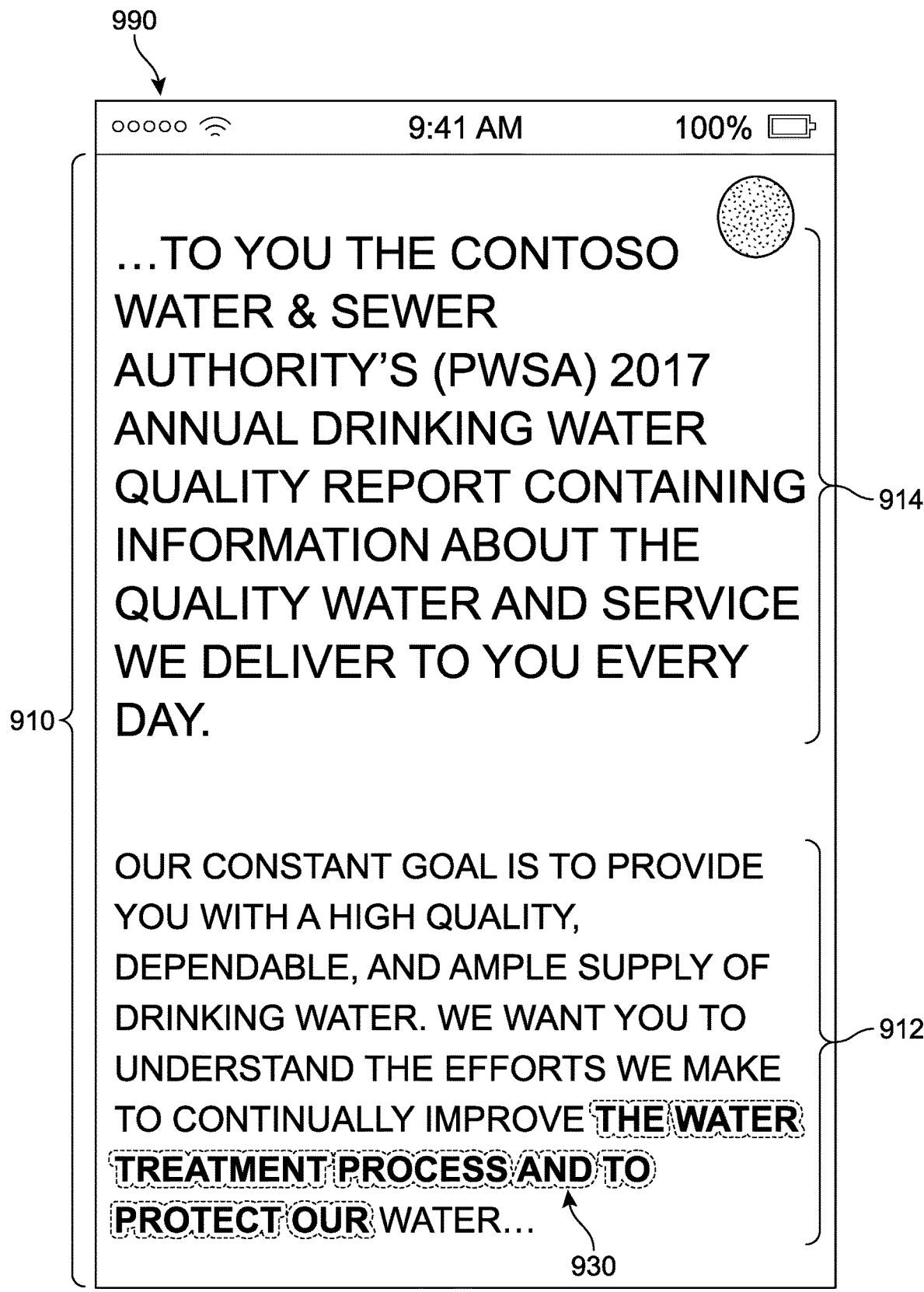
FIG. 9A is a computing display illustrating an implementation of a document presentation user interface configured to present a first portion of audio-visual content associated with a document.

As described earlier, implementations of the systems described herein can include provisions for easily navigating through the electronic content audio presentation. FIGS. 9A-9D provide one example of such a navigation tool. In FIG. 9A, a second user interface ("second interface") 990 is shown in the second mode (see FIG. 3), where a display region 910 is substantially 'full-screen' and encompasses a substantial entirety of the interface window. Below an introduction section 914, the display region 910 also displays document body text 912, displayed in a smaller lettering size relative to the words in the introduction section 914. As document playback continues, in some implementations, the portion of text that is being read, about to be read, or was just read in the last few seconds can be highlighted to represent a first spoken portion 930, which can help a reader identify the content being spoken during a quick glance as needed, as well as easily 'locate' themselves in the document.

It may be appreciated that a listener may sometimes wish to repeat or otherwise differently navigate through the document than what is normally presented (i.e., in order of the consecutive pages of the document). For example, a user may wish to rewind or forward the audio content (or jump forward or backward through the pages of the document). As mentioned earlier, in some implementations, a document transition menu may be provided. In FIG. 9B, the display of the second interface 990 has again switched such that the document transition menu 924 is expanded in a third mode, where preferences associated with the menu are presented, and/or the menu has been scrolled upward to 'reveal' additional options. A play/pause button 942, a rewind/back button 944, and a forward/skip button 946 are shown, and in some implementations, a user may indicate what degree or unit of measurement should be applied as a result of the selection of a navigation button. In other words, because the audio presentation is primarily based on events, rather than time, the audio navigation experience can be arranged to align with this approach. Thus, while the play/pause button 942 can correspond to a more traditional means of interrupting (pausing) the playback experience, the rewind/back button 944 and the forward/skip button 946 can be used to move through specific content portions or sub-portions.

An example of possible content portion characterizations 950 (or content intervals) are listed in FIG. 9B, including sentence, paragraph, page, section, comment, slide, or custom. Depending on the user's selection, the rewind/back button 944 and the forward/skip button 946 can be used to jump or move through the audio (a) sentence by sentence, (b) paragraph by paragraph, (c) section by section, (d) comment by comment, (e) slide by slide, or (0 custom (e.g., user can more narrowly define what interval type should be used during use of the rewind/back button 944 and the forward/skip button 946, including by time intervals, chapters, words, graphs, tables, etc.). The ability to travel through a document by pre-defined demarcated content portions, rather than being limited to intervals of time, can greatly enhance the document listening experience by empowering users to quickly review salient points in the document or easily locate a desired content piece.

Figure 9C:
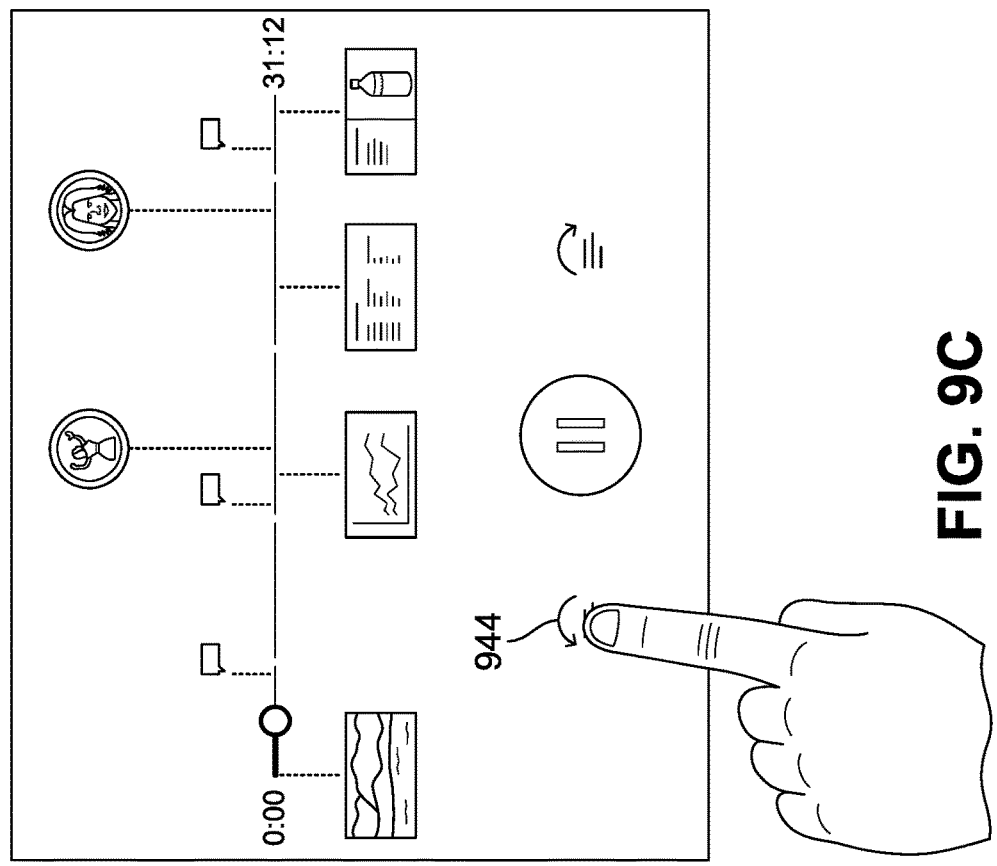
FIGS. 9B and 9C illustrate an example of a preferences menu associated with the audio navigation tool interface of FIG. 5.
Figure 9B:
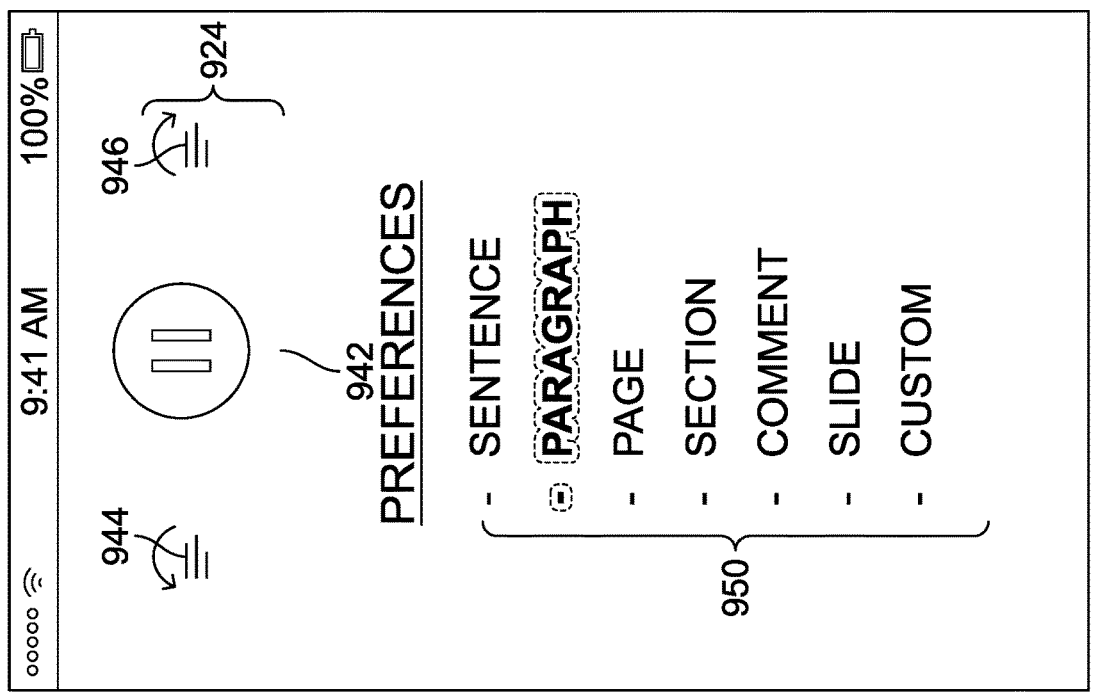
Figure 9D:
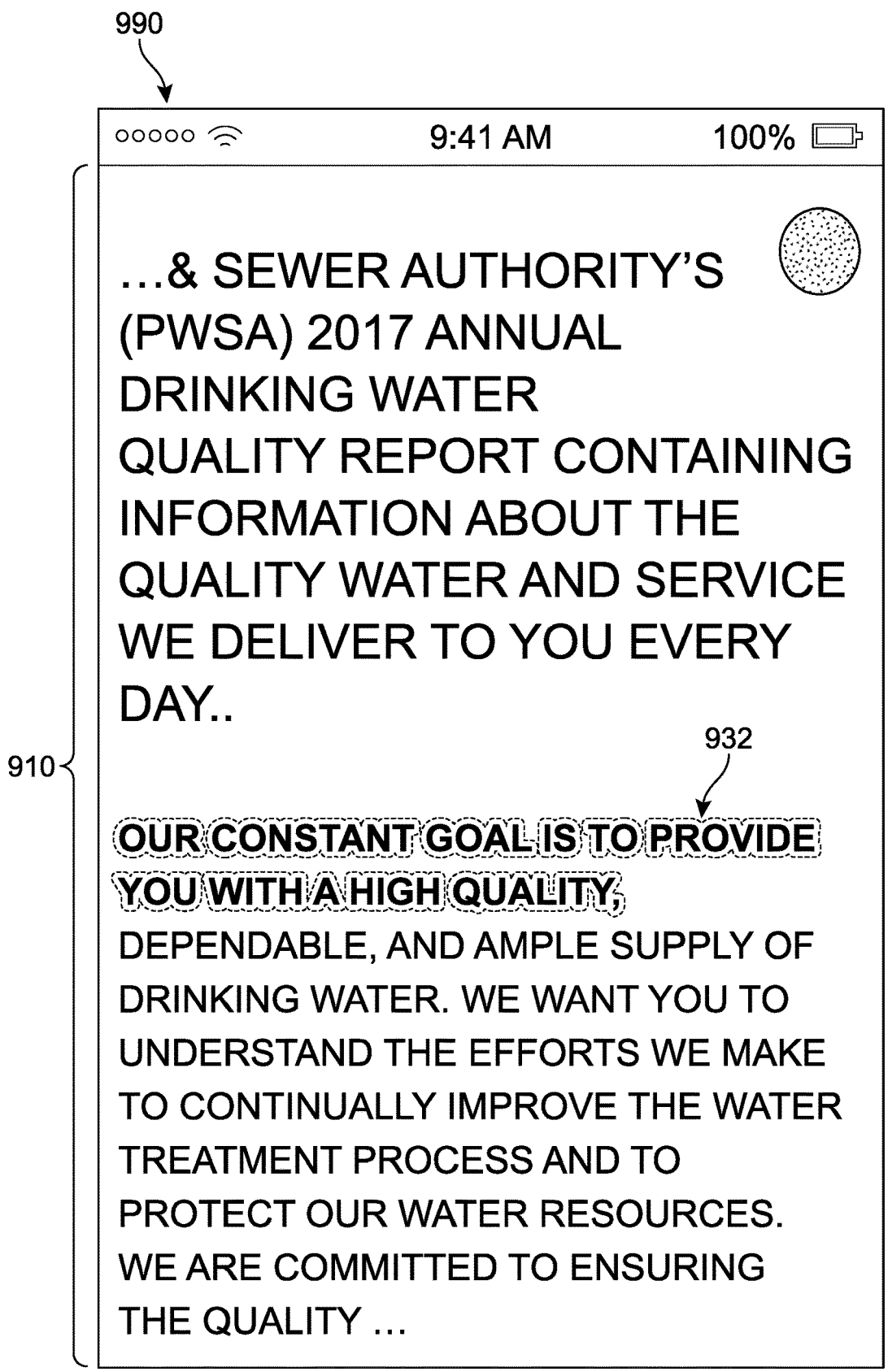
FIG. 9D is a computing display illustrating an implementation of a document presentation user interface configured to present a second portion of audio-visual content associated with a document.

In FIG. 9C, a user (represented by a hand 900) provides an input to the application via a second device, thereby selecting the rewind/back button 944. In response to the user selection, and in accordance with the user's preferences, the audio presentation will move back one paragraph. This is illustrated in FIG. 9D, where a second spoken portion 932 is now highlighted, reflecting the 'rewind' of the presentation to the start of the most recent paragraph. In addition, the text displayed has scrolled back (relative to FIG. 9A) to better accommodate the return to a previous content portion. While the content interval was chosen by the user in this example, it should be understood that in other implementations, the system can automatically apply a default content interval for responding to requests to rewind or forward the presentation.

In different implementations, event-lines for documents can vary in size or dimension. For example, an event-line may vary in length in accordance with the number of events that are displayed for the user. As different pieces of meaning or semantic attributes can be distributed throughout various portions of electronic content, the event-line may sometimes be larger than can be comfortably viewed in a typical device display. In order to accommodate these variations in event-line capacity and features, the system can include provisions for presenting portions of the event-line in a manner that nevertheless maintains a sense of continuity for a viewer. For example, the user may be able to scroll (e.g., left to right, right to left) to move continuously through the event-line, the user may be able to shift between discrete but connected segments of the event-line, and/or view a minimalized (high-level) event-line with few or no semantic attributes or collaborator alerts, and then zoom in to a region of the event-line to expose or reveal the more low-level or detailed view of the same event-line. In other implementations, the portions relevant or adjacent to the content portion or audio segment that is currently being played can be shown, and the displayed event-line can translate or move along toward the next portion or audio segment as the presentation continues.

Figure 10A:
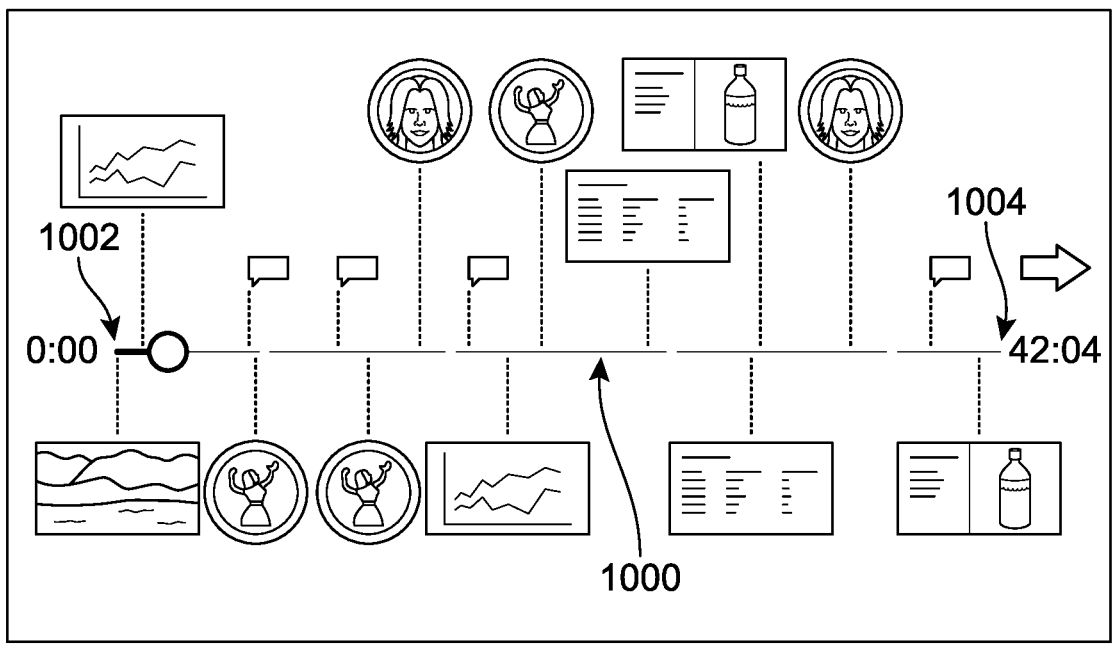
FIGS. 10A and 10B depict another implementation of an audio navigation tool.
Figure 10B:
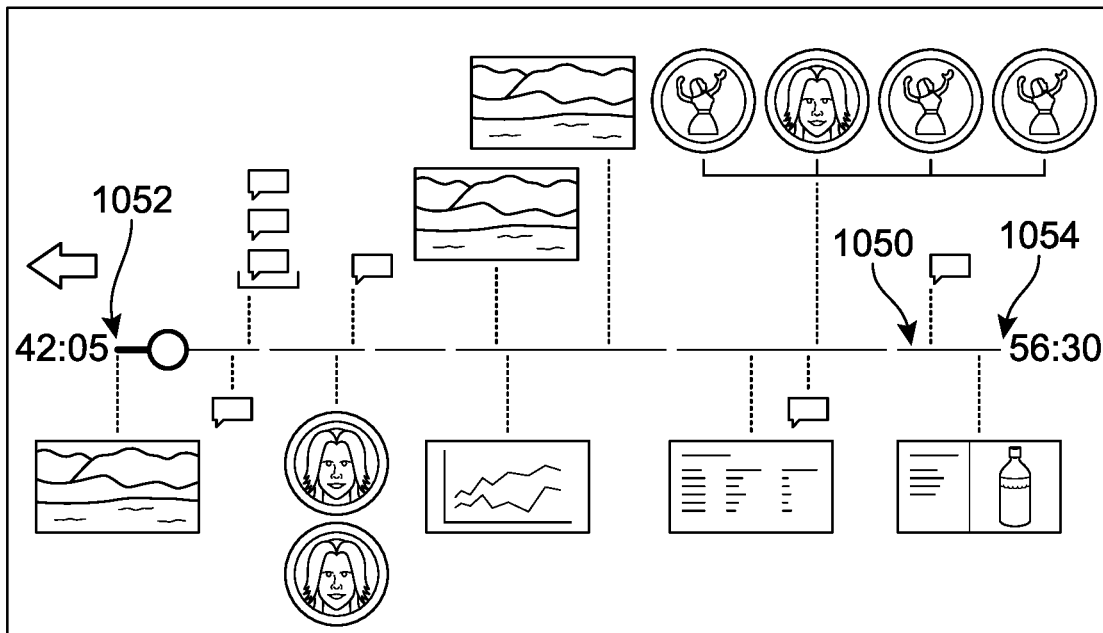

FIGS. 10A and 10B present one example of such a mechanism. FIG. 10A represents a first event-line portion 1000 and FIG. 10B represents a second event-line portion 1050, where both portions represent sections of the same document. FIG. 10A extends from a first end 1002 that is at time 0:00 (start point) in the document to a second end 1004 that is at time 42:04 (a first intermediate point). Similarly, FIG. 10B extends from a third end 1052 that is at time 42:05 (a second intermediate point) to a fourth end 1054 that is at time 56:30 (end point). The two portions can be seen to differ in (a) the number, placement, and location of various events and notifications (e.g., collaborator alerts, comments, contextual events) and (b) the chronological time represented by the portion.

The length of the first event-line portion 1000 in FIG. 10A appears to include a greater frequency of events and notifications relative to the length of the second event-line portion 1050. However, the length of the first event-line portion 1000 represents a greater period of time (42 minutes and 2 seconds) versus the period of time (approximately 14 minutes and 30 seconds) represented by the length of the second event-line portion 1050. This disparity can occur when the system determines that portions of the event-line should be 'stretched' or compressed to better accommodate the types and numbers of events and notifications available within that portion of the document.

Figure 11:
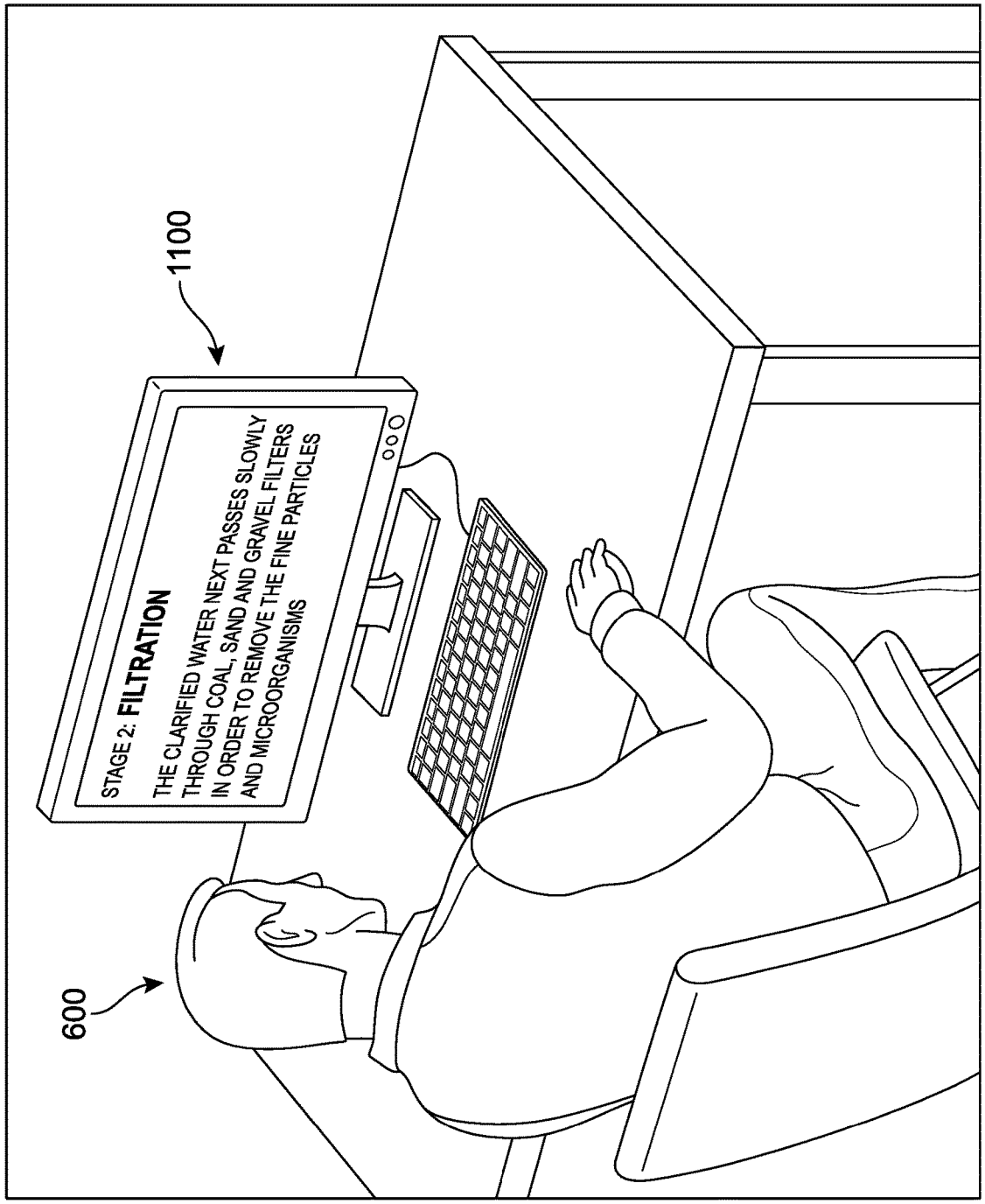
FIG. 11 is an example of a computing environment in which a user can access a document that was previously presented via an audio playback session.

As discussed above, in different implementations, a user may be able to benefit from the audio presentation of a document, and then return to the primarily visual presentation of the same document in a substantially seamless manner. One example of this is shown in FIG. 11, where the first participant 600 of FIG. 6A has completed their access of the document via the audio presentation and corresponding content provided by the presentation client. The first participant 600 is now accessing the same document via a desktop computing device 1100. When the first participant 600 opens the document via its native application, rather than displaying the 'start' of the document, as would normally occur upon opening of a file, the most recent or the last presented portion 1120 of content from the audio presentation is displayed. In other words, the system can be configured to remember or record the point at which the user paused or otherwise interrupted audio playback, and then continue the presentation from that point regardless of the type of presentation application subsequently used. This can encourage users to engage with the presentation client more often, and help them feel more confident in switching between the client application view of the document and an audio presentation of the document. There will be no burden for a user to remember the specific words from the audio that were narrated last in order to find and resume one's place in the document when switching to the native application. Such cross-application synchronization features can provide users with a strong sense of continuity and comfort. Furthermore, the same features can be used to help users resume the presentation as audio content after accessing the document from the desktop or the native application. Similarly, in different implementations, the system can include provisions for moving through the document—either from the presentation client or the native application—via comments or markers inserted in the document during access of the document from the presentation client or the native application. Thus, as described above with reference to FIGS. 7 and 8, the addition of comments or other bookmarks, highlighting, or notes can be used to run a search through the document for personally relevant document events. For example, a user may add a bookmark to a paragraph via voice-command (e.g., Microsoft Cortana®) while listening to the audio presentation of a document. Later the same user may open the document at a desktop device, and perform a search for bookmarks that he or she added, and find the same bookmark, at the location where he or she requested the addition of that bookmark.

Figure 12A:
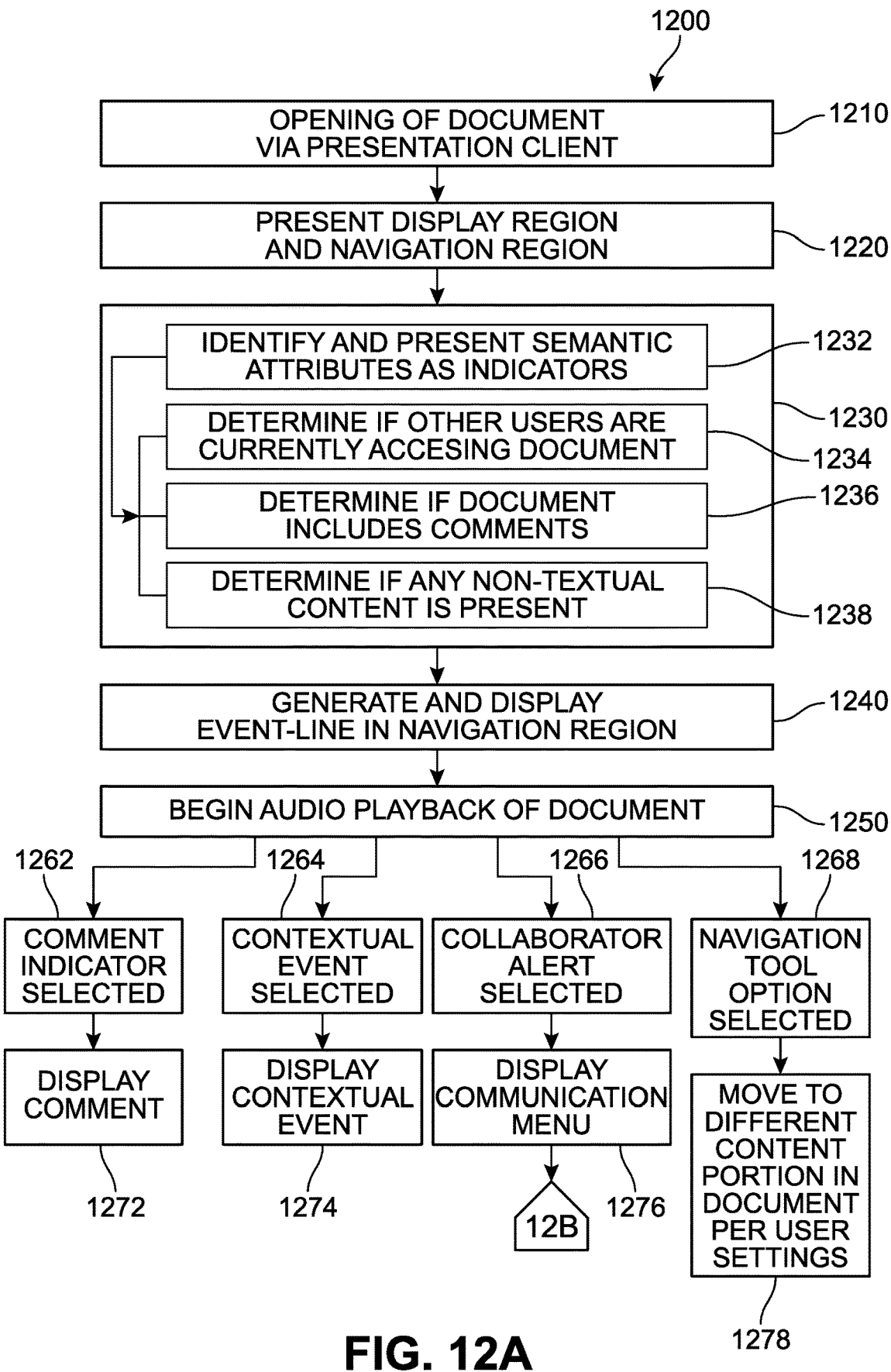
FIGS. 12A and 12B are flow diagrams illustrating an implementation of a process for presenting audio-visual content for an electronic document.
Figure 12B:
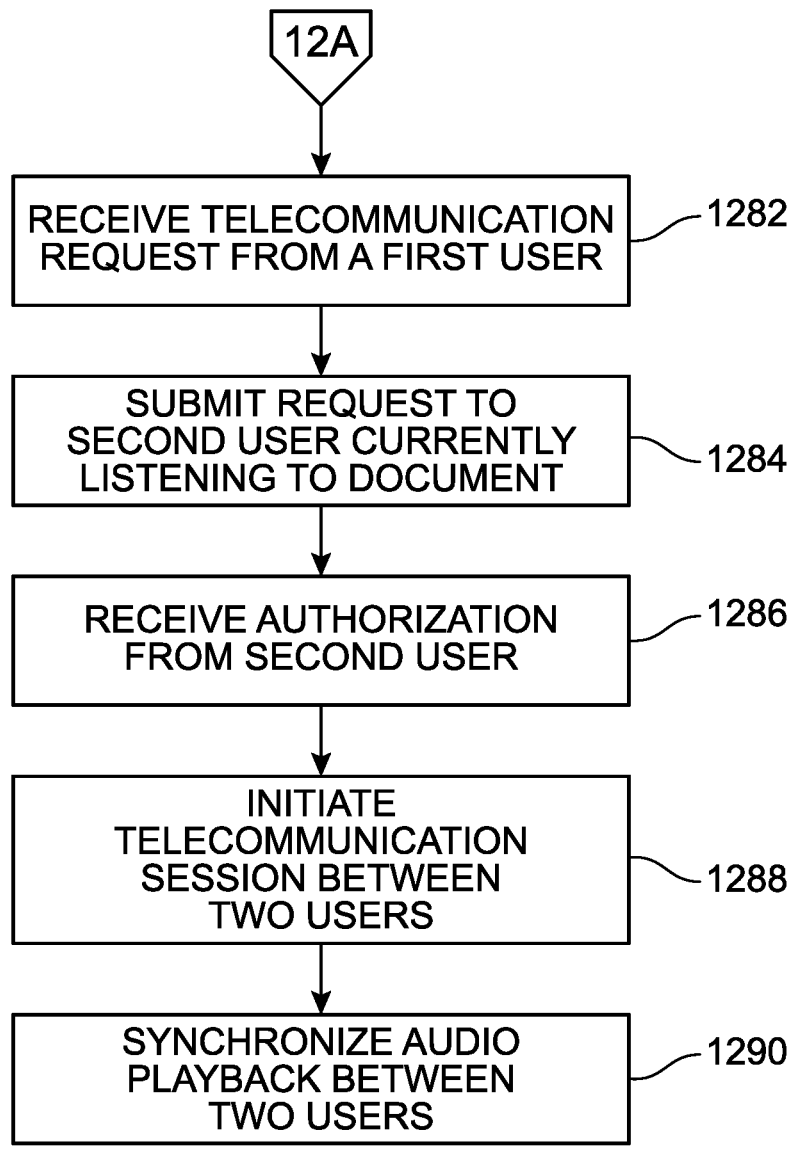

As one example, a process 1200 of presenting and managing semantic attributes and other indicators for electronic documents is presented in FIG. 12A. In FIG. 12, a first step 1210 can involve the opening or access of an electronic content item via an implementation of the presentation client, which can trigger the display in a second step 1220 of the display region and navigation region (see for example, FIGS. 2-4). In order for the second step 1220 to present the appropriate or expected indicators, it can first review the document data and information associated with the document in order make several decisions, depicted here as a third step 1230. In some implementations, this can involve identification of any semantic attributes in a first substep 1232. These semantic attributes will be presented as indicators, with reference to the various indicator categories or classifications applied (see for example, FIG. 5). Some of these include determining if there are other users currently accessing the document (see for example, FIGS. 6A-6C) in a second substep 1234, determining if the document includes any comments (see for example FIGS. 7A and 7B) in a third substep 1236, and/or determining if the document includes non-textual content (see for example, FIGS. 8A and 8B) in a fourth substep 1238.

Once this assessment has occurred, and an event-line for the document has been populated with the relevant indicators in a fourth step 1240, the system can begin audio playback of the document in a fifth step 1250. This can occur automatically after the document is opened on the presentation client, or as a result of client input requesting the playback to begin. Prior to, during, or after playback—or while the playback is paused—a user can interact with any of the indicators displayed on the event-line. In some implementations, the user may select a comment indicator (step 1262), which can lead to an automatic display of that comment in the interface (step 1272). In another implementation, the user may select a contextual event type indicator (step 1264), which can lead to an automatic display of the contextual event visual element in the interface (step 1274). In one implementation, the user can select one of the navigation tool options (e.g., forward, rewind, play/pause) as a step 1268, which can trigger the system to 'move' through the audio of the document to another content portion (step 1278).

In some other implementations, a collaborator alert can be selected (a sixth step 1266), triggering an automatic display off a collaborator profile and/or a communication menu (a seventh step 1276). Continuing with this process in FIG. 12B, in some implementations, the system can receive a request to initiate a telecommunications session between two users in an eighth step 1282, and submit this request to a second user that is also accessing the document in a ninth step 1284. Once authorization has been received from the second user in a tenth step 1286, the system can automatically establish a telecommunications session between the two users in an eleventh step 1288. In addition, in some implementations, the system can be configured to automatically synchronize the playback of the audio content between the two users in a twelfth step 1290.

Figure 13:
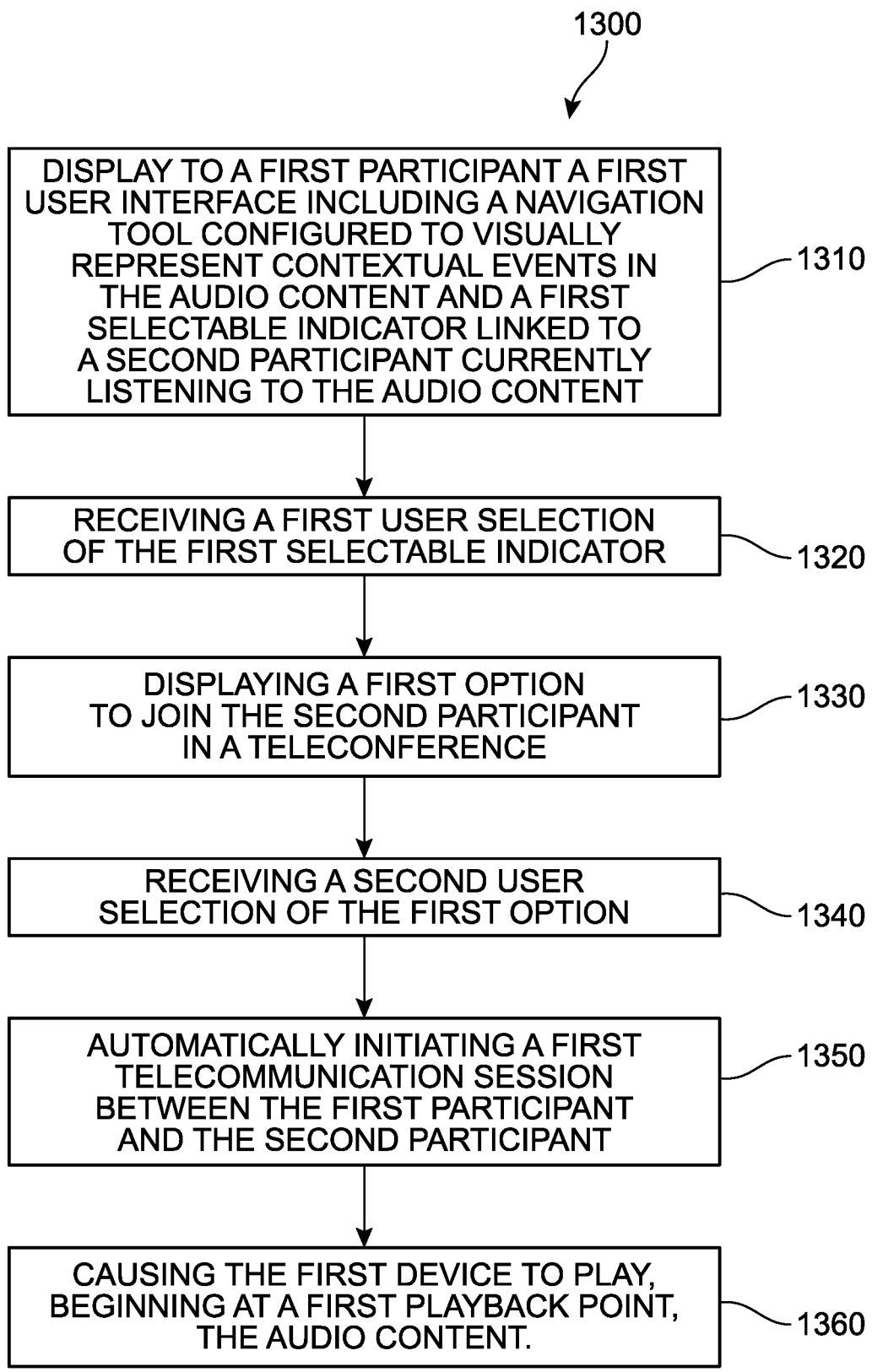
FIG. 13 is a flow diagram of an implementation of a method of connecting participants to a teleconference during an audio presentation of a document.

FIG. 13 is a flow chart illustrating an implementation of a method 1300 of joining participants in a teleconference to provide a shared listening experience. A first step 1310 includes causing to be displayed, on a first device to a first participant, a first user interface for presentation of audio content. The first user interface includes a navigation tool that is configured to visually represent contextual events in the audio content, as well as a first selectable indicator linked to a second participant currently listening to the audio content via a second device. A second step 1320 includes receiving a first user selection of the first selectable indicator, and a third step 1330 includes automatically displaying, in the first user interface (in response to the first user selection) a first option to join the second participant in a teleconference. Furthermore, a fourth step 1340 can include receiving a second user selection of the first option, and a fifth step 1350 involves automatically initiating (in response to the second user selection) a first telecommunication session between the first participant and the second participant. Finally a sixth step 1360 includes causing the first device to play, beginning at a first playback point, the audio content.

In other implementations, the method may include additional steps or aspects. In some implementations, the method may also include synchronizing playback of the audio content between the first device and the second device when the first telecommunication session is initiated. In another implementation, the method includes synchronizing a position of the first selectable indicator relative to the reference tool to signify or denote a current (real-time) playback point for the second participant. In some cases, the first selectable indicator is closer to a first end of the navigation tool than to a second end at a first point in time, and then (at a second point in time later than the first point in time) the first selectable indicator is closer to the second end than to the first end.

In some other implementations the method may involve receiving, from a third device, a request from a third participant to join the teleconference, and then causing to be displayed, in the first user interface on the first device, the request from a third participant to join the teleconference. In addition, the method includes receiving, from the first device, authorization to add the third participant to the teleconference, and automatically initiating, in response to the authorization to add the third participant, a second telecommunication session between the first participant and the third participant. The method may also involve synchronizing playback of the audio content between the first device and the third device when the second telecommunication session is initiated.

As another example, the method may involve causing to be displayed, in the first user interface, a second selectable indicator linked to a third participant currently listening to the audio content via a third device, as well as receiving a second user selection of the second selectable indicator. Furthermore, the method includes automatically displaying, in the first user interface (in response to the second user selection) a second option to add the third participant to the teleconference, and then receiving, from the third device, an authorization for the third participant to be added to the teleconference. The method also includes automatically initiating, in response to the authorization to add the third participant, a second telecommunication session between the first participant and the third participant, and then synchronizing playback of the audio content between the first device, the second device, and the third device when the second telecommunication session is initiated.

In some other implementations, the method can include causing to be displayed, in the first user interface, a second selectable indicator linked to a third participant currently listening to the audio content via a third device. The method may further include receiving a second user selection of the second selectable indicator, and then automatically displaying, in the first user interface, in response to the second user selection, a user profile and availability status for the third participant. In one example, the navigation tool includes a selectable contextual event indicator. The method can also then include receiving a second user selection of the selectable contextual event indicator linked to a first segment of the audio content, and automatically displaying, in the first user interface, in response to the second user selection, at least a portion of a comment directed to sub-content conveyed during the first segment of the audio content.

Other methods can also be contemplated within the scope of this disclosure. For example, a method of delivering audio-visual content associated with an electronic document including textual content to a device may be provided. In a first step, the method includes causing to be displayed, on a first device to a first user, a first user interface for presentation of the audio-visual content. The first user interface including a navigation tool configured to visually represent contextual events in the audio-visual content, the navigation tool including a first selectable indicator for a first contextual event. A second step includes receiving a first user selection of the first selectable indicator. In a third step, the method involves automatically displaying, in the first user interface, in response to the first user selection, a first visual element contained in the electronic document that is linked to the first contextual event. A fourth step includes causing the first device to recite a first textual sub-content in the electronic document as synthesized speech, the first textual sub-content being associated with the first visual element.

In different implementations, this method can include additional or other steps. In one implementation, the first visual element is a comment about the first textual sub-content added by an accessor of the electronic document. As another example, the first visual element is an image stored in the electronic document. In some implementations, the navigation tool also includes a second selectable indicator for a second contextual event, and selection of the second selectable indicator causes the first device to recite a different, second textual sub-content in the electronic document as synthesized speech.

In some cases, the method also includes causing to be displayed, adjacent to the navigation tool, a first option for navigating the audio-visual content by pre-defined intervals demarcated by content elements in the electronic document, and then receiving a second user selection of the first option. The method can further include causing the first device to recite, in response to the second user selection, a second textual sub-content as synthesized speech, the second textual sub-content being associated with a content element that occurs prior to or subsequent to an occurrence of the first textual content in the electronic document. In some implementations, the second textual sub-content is one of a previous or subsequent sentence, paragraph, page, section, and chapter in the electronic document.

Other methods can also be contemplated within the scope of this disclosure. For example, a method of navigating through an audio playback of an electronic document may be provided. In a first step, the method includes displaying, on a first device, a first user interface for presentation of audio content corresponding to a synthesized speech presentation of the electronic document. The first user interface including a document transition menu including selectable options for navigating through the audio content by discrete contextual events. The method also includes receiving a first user selection of a first selectable option of the document transition menu, and automatically initiating, in response to the first user selection, playback of the electronic document from a point corresponding to a first contextual event. In some implementations, the first contextual event is one of a previous or subsequent sentence, paragraph, page, section, and chapter in the electronic document. In another implementation, the first selection option is for rewinding the audio playback of the electronic document. In different implementations, this method can include additional or alternate steps. For example, the method can include automatically displaying, in response to the first user selection, a visual representation of a first textual content associated with the first contextual event.

Other methods can also be contemplated within the scope of this disclosure. For example, a method of delivering audio-visual content associated with an electronic document to a device can be provided. A first step can include displaying on the device, a first user interface for presentation of the audio-visual content, the first user interface including a navigation tool. The navigation tool is configured to visually represent contextual events in the audio-visual content, and includes a first selectable indicator for a first contextual event. A second step includes receiving a first user selection of the first selectable indicator, and a third step includes automatically presenting, in response to the first user selection, a visual content in the electronic document that is linked to the first contextual event.

In some implementations, the visual content is a comment about a first textual portion added by an accessor of the electronic document. In another example, the comment includes a first option to begin an audio playback of the electronic document at a point in time associated with the comment. In such cases, the method can further include receiving a second user selection of the first option, and causing the first device to begin playback of the electronic document as synthesized speech from the point in time associated with the comment.

In other implementations, the method also includes causing the device to recite a first textual portion of the electronic document as synthesized speech, the first textual portion being associated with the content. In one example, the navigation tool also includes a second selectable indicator for a second contextual event, and selection of the second selectable indicator causes the device to recite a second textual portion of the electronic document as synthesized speech. In another example, the visual content is an image within the electronic document. In some implementations, the method also includes causing to be displayed, adjacent to the navigation tool, a first option for navigating the audio-visual content by pre-defined intervals corresponding to each portion of text exhibiting a selected semantic attribute in the electronic document, receiving a second user selection of the first option, and causing the first device to recite, in response to the second user selection, a second textual portion of the electronic document as synthesized speech, the second textual portion corresponding to a semantic attribute that occurs prior to or subsequent to an occurrence of the first textual portion in the electronic document. In different implementations, the second textual portion is one of a previous or subsequent sentence, paragraph, page, section, and chapter in the electronic document.

Other methods can also be contemplated within the scope of this disclosure. For example, a method for presentation of content associated with an electronic document can include a first step of displaying on a device a first user interface for presentation of the content, the first user interface including a navigation tool configured to visually represent contextual events that occur in the electronic document. A second step can include identifying at least a first contextual event that is associated with a first visual element stored in the electronic document. In a third step, the system can render a first icon that corresponds to the first visual element, and a fourth step includes adding the first icon to the navigation tool. In some implementations, the first icon is a selectable option for navigating to the first contextual event and beginning an audio playback of text associated with the first contextual event.

The range of benefits provided by the systems and methods described herein extend across a wide variety of fields. For example, the display of semantic indicators with audio content can augment accessibility and learning tools for many individuals. It has been shown across multiple studies that the ability comprehend and retain knowledge increases dramatically when learning occurs as a result of both sight and hearing (rather than only sight, or only hearing). Similarly, users will be able to appreciate and understand relative criticality of information. In addition, this type of presentation can facilitate conversations between authors and reviewers, provide for simpler reviewer feedback options and simplify the navigation between document text and document comments. Organizations, groups, and companies can use these systems to communicate and disseminate important information more rapidly, as well as determine which individual users can be permitted to view or contact different users, per internal management policies. These permissions can also be selected by a user to ensure privacy and sharing settings reflect the user's own preferences.

Organizations can also make use of these systems to keep track of feedback from specific groups or employees, access metrics about how people interact or share or comment through the interface, data on what features are used more (or less) in the document, patterns in the listener's behavior or selections, which portions have the most comments, and/or how often shared listening experiences are occurring and what types of individuals prefer these experiences. Implementations of these systems can also take advantage of native applications that provide options during document creation to establish and generate clear semantic attribute indicators, such that an author or group has the ability to guide the type of structure or contextual events that are identified on the event-line. This blending of audio and visual elements will offer users a much richer, empowering document comprehension experience.

Implementations of the present disclosure can make use of any of the features, systems, components, devices, and methods described in U.S. Patent Publication Number 2011/0054903 to Yan et al., published Mar. 3, 2011 and titled "Rich context modeling for text-to-speech engines"; U.S. Patent Publication Number 2016/0078859 to Luan et al., published Mar. 17, 2016 and titled "Text-to-speech with emotional content"; U.S. Patent Publication Number 2011/0179180 to Schleifer et al., published Jul. 21, 2011 and titled "Communication sessions among devices and interfaces with mixed capabilities"; U.S. Patent Publication Number 2014/0142929 to Seide et al., published May 22, 2014 and titled "Deep neural networks training for speech and pattern recognition"; U.S. Patent Publication Number 2013/0218566 to Qian et al., published Aug. 22, 2013 and titled "Audio human interactive proof based on text-to-speech and semantics"; U.S. Patent Publication Number 2013/0144603 to Lord et al., published Jun. 6, 2013 and titled "Enhanced voice conferencing with history"; U.S. Patent Publication Number 2018/0218727 to Cutler et al., published Aug. 2, 2018 and titled "Artificially generated speech for a communication session"; U.S. Patent Publication Number 2013/0144619 to Lord et al., published Jun. 6, 2013 and titled "Enhanced voice conferencing"; U.S. Patent Publication Number 2016/0071510 to Li et al., published Mar. 10, 2016 and titled "Voice generation with predetermined emotion type"; U.S. Pat. No. 7,844,457 to Chen et al., issued Nov. 30, 2010 and titled "Unsupervised labeling of sentence level accent"; U.S. Patent Publication Number 2017/0287465 to Zhao et al., published Oct. 5, 2017 and titled "Speech Recognition and Text-to-Speech Learning System"; U.S. Pat. No. 7,836,437 to Kacmarcik, issued Nov. 16, 2010 and titled "Semantic annotations for virtual objects"; U.S. Pat. No. 7,502,785 to Chen et al., issued Mar. 10, 2009 and titled "Extracting semantic attributes"; U.S. Pat. No. 8,150,859 to Vadlamani et al., issued Apr. 3, 2012 and titled "Semantic table of contents for search results"; U.S. Patent Publication Number 2011/0314024 to Chang et al., published Dec. 22, 2011 and titled "Semantic content searching"; U.S. Patent Publication Number 2017/0004205 to Jain et al., published Jan. 5, 2017 and titled "Utilizing semantic hierarchies to process free-form text"; U.S. Patent Publication Number 2017/0061250 to Gao et al., published Dec. 5, 2017 and titled "Discovery of semantic similarities between images and text"; U.S. Patent Publication Number 2016/0344677 to Macdonald et al., published Nov. 24, 2016 and titled "Unified messaging platform for providing interactive semantic objects"; U.S. Patent Publication Number 2017/0046319 to Kikin-Gil et al., published Feb. 16, 2017 and titled "Providing semantic based document editor"; U.S. Patent Publication Number 2017/0046310 to Kikin-Gil et al., published Feb. 16, 2017 and titled "Providing semantic based document design"; U.S. Patent Publication Number 2018/0232608 to Pradeep et al., published Aug. 16, 2018 and titled "Associating semantic identifiers with objects"; U.S. Patent Publication Number 2018/0217725 to Wygonik et al., published Aug. 2, 2018 and titled "Navigational Aid for a Hinged Device via Semantic Abstraction"; and U.S. Patent Publication Number 2016/0275073 to Poon et al., published Sep. 22, 2016 and titled "Semantic parsing for complex knowledge extraction," the disclosures of each of which are herein incorporated by reference in their entirety.

The detailed examples of systems, devices, and techniques described in connection with FIGS. 1-13 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 14:
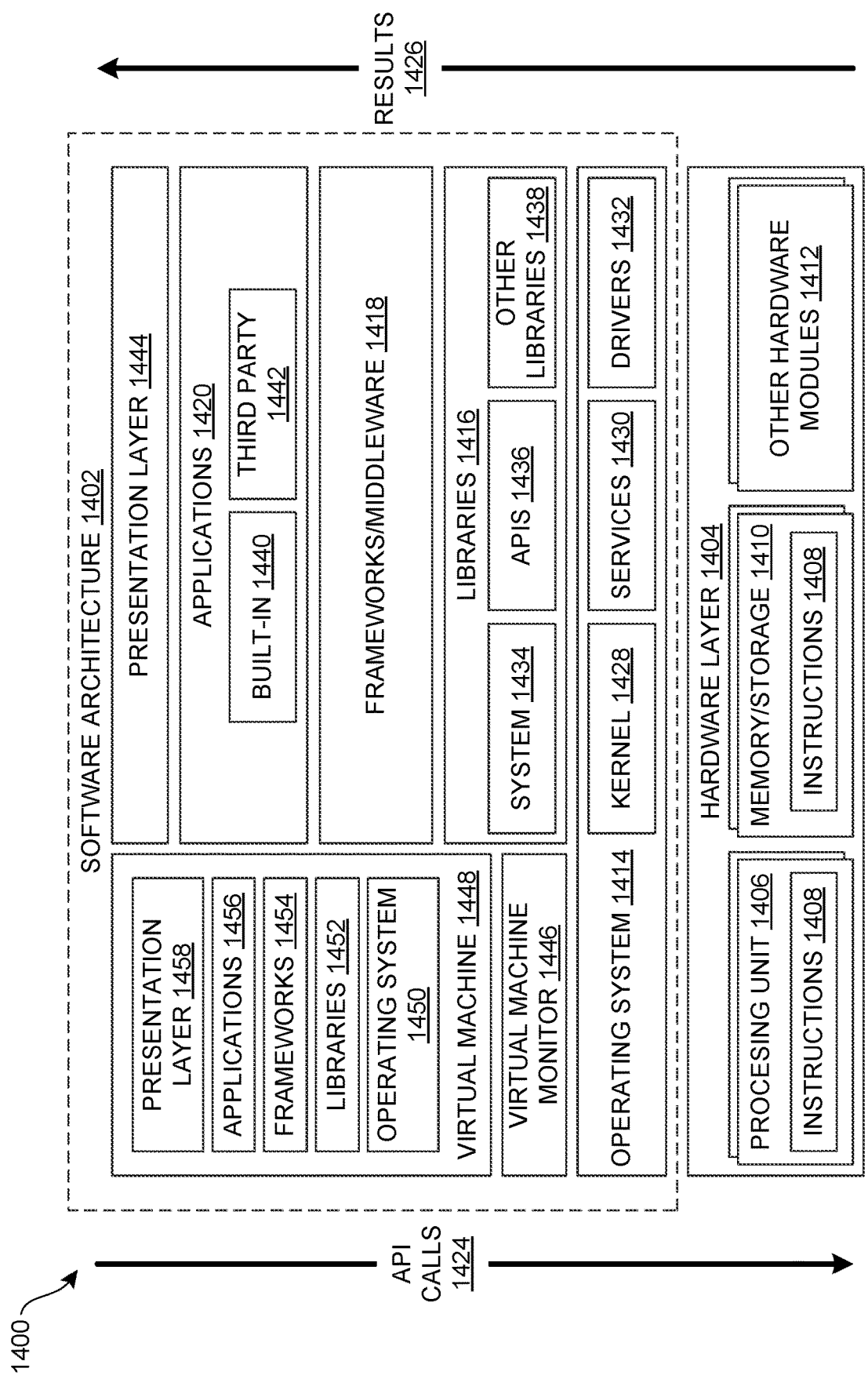
FIG. 14 is a block diagram of an example computing device, which may be used to provide implementations of the mechanisms described herein.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture, and it will be appreciated that many other architectures may be implemented to facilitate the functionality described herein. The software architecture 1402 may execute on hardware that includes, among other things, document storage, processors, memory, and input/output (I/O) components. A representative hardware layer 1404 is illustrated and can represent, a computing device. The representative hardware layer 1404 includes a processing unit 1406 and associated executable instructions 1408. The executable instructions 1408 represent executable instructions of the software architecture 1408, including implementation of the methods, modules and so forth described herein. The hardware layer 1404 also includes a memory/storage 1410, which also includes the executable instructions 1408 and accompanying data. The hardware layer 1404 may also include other hardware modules 1412. Instructions 1408 held by processing unit 1408 may be portions of instructions 1408 held by the memory/storage 1410.

The example software architecture 1402 may be conceptualized as layers, each providing various functionality. For example, the software architecture 1302 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1430 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1500 of FIG. 15, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1450, libraries 1452, frameworks 1454, applications 1456, and/or a presentation layer 1458.

Figure 15:
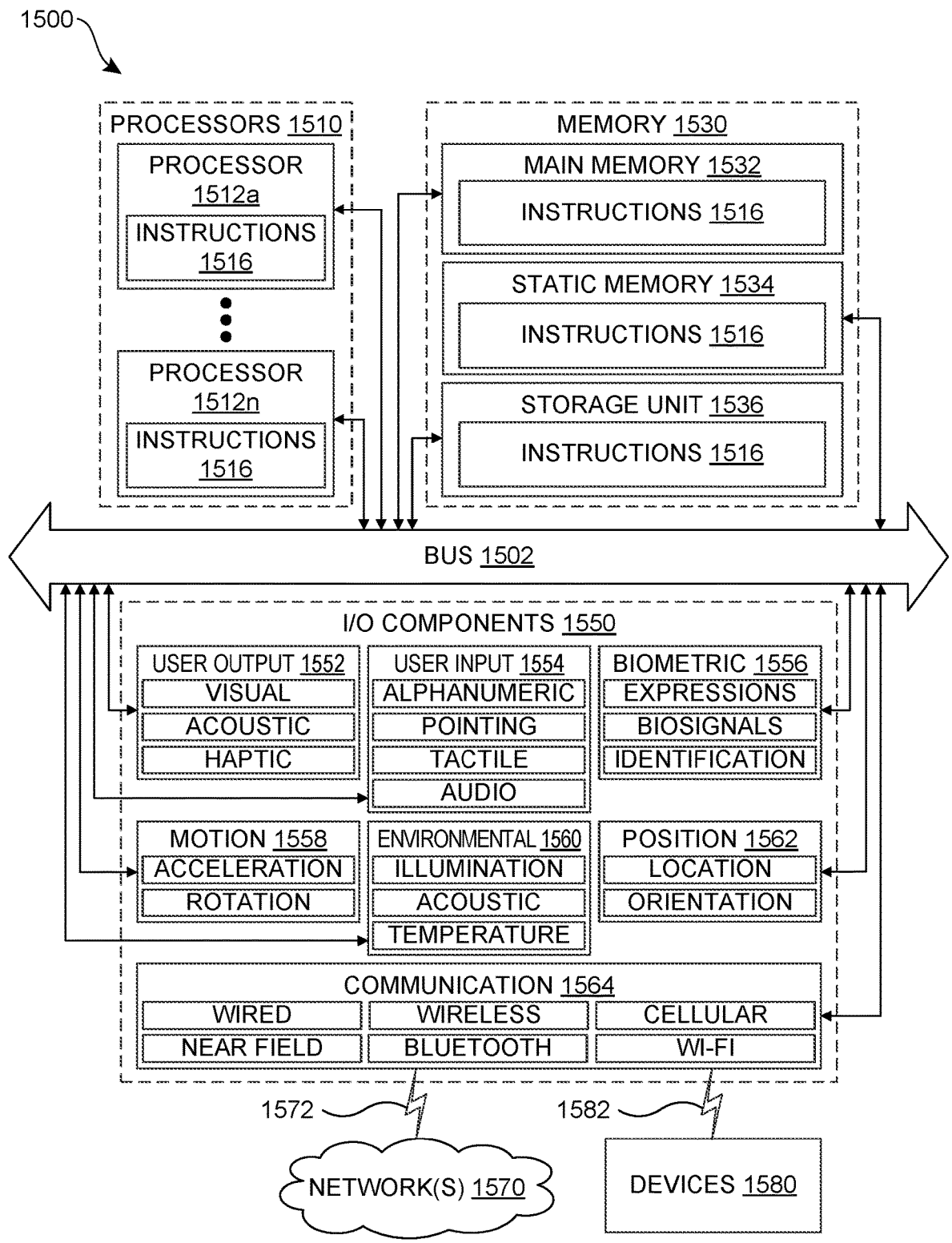
FIG. 15 is a block diagram illustrating components of an example machine configured to read instructions from a machine-readable medium.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors 1512a to 1512n that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556 and/or position components 1562, among a wide array of other environmental sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network (s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
   at least one processor; and
   one or more machine-readable media including instructions which, when executed by the at least one processor, cause the at least one processor to:
   display, on a first device to a first participant, a first user interface for presentation of audio content associated with an electronic document, the first user interface including a navigation tool configured to visually represent a plurality of first selectable indicators associated with a plurality of discrete contextual events in the audio content and a second selectable indicator linked to a second participant, each of the plurality of discrete contextual events corresponding to a portion of the electronic document that is associated with a particular semantic attribute and each of the plurality of first selectable indicators being associated with a respective playback point of the audio content, the respective playback point being associated with a respective discrete contextual event from among the plurality of discrete contextual events;
   receive a first user selection of the second selectable indicator;
   initiate, in response to at least the first user selection, a first telecommunication session between the first participant and the second participant;
   receive a second user selection of a respective selectable indicator from among the plurality of first selectable indicators, the respective selectable indicator being associated with a first discrete contextual event from among the plurality of discrete contextual events; and
   synchronize, in response to at least the second user selection, playback of the audio content between the first device and a second device of the second participant at the respective playback point of the audio content associated with the first discrete contextual event.

2. The system of claim 1, wherein the instructions further cause the at least one processor to:
   automatically display, in the first user interface, in response to the first user selection, a first option to join the second participant in the first telecommunication session;
   receive a third user selection of the first option; and
   wherein the first telecommunication session is initiated in response to both the first user selection and the third user selection.

3. The system of claim 1, wherein the instructions further cause the at least one processor to synchronize a position of the second selectable indicator relative to the navigation tool to denote a most recent playback point for the second participant.

4. The system of claim 1, wherein the navigation tool includes a selectable contextual event indicator, and wherein the instructions further cause the at least one processor to:
   receive a third user selection of a second respective selectable contextual event indicator linked to a first segment of the audio content; and
   automatically display, in the first user interface, in response to the third user selection, at least a portion of a comment directed to sub-content conveyed during the first segment of the audio content.

5. The system of claim 1, wherein the instructions further cause the at least one processor to:
   receive, from a third device, a request from a third participant to join the first telecommunication session;
   cause to be displayed, in the first user interface on the first device, the request from a third participant to join the first telecommunication session;
   receive, from the first device, authorization to add the third participant to the first telecommunication session;
   automatically initiate, in response to the authorization to add the third participant, a second telecommunication session between the first participant and the third participant; and
   synchronize playback of the audio content between the first device and the second device when the second telecommunication session is initiated.

6. The system of claim 1, wherein the instructions further cause the at least one processor to:
   cause to be displayed, in the first user interface, a third selectable indicator linked to a third participant currently listening to the audio content via a second device;
   receive a third user selection of the third selectable indicator;
   automatically display, in the first user interface, in response to the third user selection, a second option to add the third participant to the first telecommunication session;
   receive a fourth user selection of the second option;
   cause to be displayed, in a second user interface on the second device, a request from the first participant to join the first telecommunication session;
   receive, from the third device, an authorization for the third participant to be added to the first telecommunication session;
   automatically initiate, in response to the authorization to add the third participant, a second telecommunication session between the first participant and the third participant; and synchronize playback of the audio content between the first device and the third device when the second telecommunication session is initiated.

7. The system of claim 1, wherein, at a first point in time, the second selectable indicator is closer to a first end of the navigation tool than to a second end, and wherein at a second point in time later than the first point in time, the first selectable indicator is closer to the second end than to the first end.

8. The system of claim 1, wherein the instructions further cause the at least one processor to:
cause to be displayed, in the first user interface, a third selectable indicator linked to a third participant currently listening to the audio content via a third device;
receiving a third user selection of the third selectable indicator; and
automatically displaying, in the first user interface, in response to the third user selection, a user profile and availability status for the third participant.

9. A method implemented in a data processing system of navigating through an audio playback of an electronic document, the method comprising:
displaying, on a first device to a first participant, a first user interface for presentation of audio content associated with an electronic document, the first user interface including a navigation tool configured to visually represent a plurality of first selectable indicators associated with a plurality of discrete contextual events in the audio content and a second selectable indicator linked to a second participant, each of the plurality of discrete contextual events corresponding to a portion of the electronic document that is associated with a particular semantic attribute and each of the plurality of first selectable indicators being associated with a respective playback point of the audio content, the respective playback point being associated with a respective discrete contextual event from among the plurality of discrete contextual events;
receiving a first user selection of the second selectable indicator;
initiating, in response to at least the first user selection, a first telecommunication session between the first participant and the second participant receiving a second user selection of a respective selectable indicator from among the plurality of first selectable indicators, the respective selectable indicator being associated with a first discrete contextual event from among the plurality of discrete contextual events; and
synchronizing, in response to at least the second user selection, playback of the audio content between the first device and a second device of the second participant at the respective playback point of the audio content associated with the first discrete contextual event.

10. The method of claim 9, further comprising:
automatically displaying, in the first user interface, in response to the first user selection, a first option to join the second participant in the first telecommunication session;
receiving a third user selection of the first option; and
wherein the first telecommunication session is initiated in response to both the first user selection and the third user selection.

11. The method of claim 9, further comprising:
synchronizing a position of the second selectable indicator relative to the navigation tool to denote a most recent playback point for the second participant.

12. The method of claim 9, wherein the navigation tool includes a selectable contextual event indicator, and the method further comprising:
receiving a third user selection of a second respective selectable contextual event indicator linked to a first segment of the audio content; and
automatically displaying, in the first user interface, in response to the third user selection, at least a portion of a comment directed to sub-content conveyed during the first segment of the audio content.

13. A machine-readable medium on which are stored instructions that, when executed, cause at least one processor of a programmable device to perform operations of:
displaying, on a first device to a first participant, a first user interface for presentation of audio content associated with an electronic document, the first user interface including a navigation tool configured to visually represent a plurality of first selectable indicators associated with a plurality of discrete contextual events in the audio content and a second selectable indicator linked to a second participant, each of the plurality of discrete contextual events corresponding to a portion of the electronic document that is associated with a particular semantic attribute and each of the plurality of first selectable indicators being associated with a respective playback point of the audio content, the respective playback point being associated with a respective discrete contextual event from among the plurality of discrete contextual events;
receiving a first user selection of the second selectable indicator;
initiating, in response to at least the first user selection, a first telecommunication session between the first participant and the second participant;
receiving a second user selection of a respective selectable indicator from among the plurality of first selectable indicators, the respective selectable indicator being associated with a first discrete contextual event from among the plurality of discrete contextual events; and
synchronizing, in response to at least the second user selection, playback of the audio content between the first device and a second device of the second participant at the respective playback point of the audio content associated with first discrete contextual event.

14. The machine-readable medium of claim 13, further comprising instructions configured to cause the at least one processor to perform operations of:
automatically displaying, in the first user interface, in response to the first user selection, a first option to join the second participant in the first telecommunication session;
receiving a third user selection of the first option; and
wherein the first telecommunication session is initiated in response to both the first user selection and the third user selection.

15. The machine-readable medium of claim 13, further comprising instructions configured to cause the at least one processor to perform operations of:
synchronizing a position of the second selectable indicator relative to the navigation tool to denote a most recent playback point for the second participant.

16. The machine-readable medium of claim 13, wherein the navigation tool includes a selectable contextual event indicator, and further comprising instructions configured to cause the at least one processor to perform operations of:

receiving a third user selection of a second respective selectable contextual event indicator linked to a first segment of the audio content; and automatically displaying, in the first user interface, in response to the third user selection, at least a portion of a comment directed to sub-content conveyed during the first segment of the audio content.

\* \* \* \* \*